United States Patent
Koosel et al.

(10) Patent No.: US 9,864,762 B2
(45) Date of Patent: Jan. 9, 2018

(54) SYSTEMS AND METHODS FOR MAPPING A VALUE TO A NEW DOMAIN

(75) Inventors: Marko Koosel, San Francisco, CA (US); Donovan Schneider, San Francisco, CA (US); Michael Tang, Petaluma, CA (US); David Park, New York, NY (US)

(73) Assignee: salesforce.com, inc., San Francisco, CA (US)

(*) Notice: Subject to any disclaimer, the term of this patent is extended or adjusted under 35 U.S.C. 154(b) by 137 days.

(21) Appl. No.: 13/360,209

(22) Filed: Jan. 27, 2012

(65) Prior Publication Data

US 2012/0330960 A1    Dec. 27, 2012

Related U.S. Application Data

(60) Provisional application No. 61/500,219, filed on Jun. 23, 2011.

(51) Int. Cl.
*G06F 17/30*    (2006.01)

(52) U.S. Cl.
CPC .............. *G06F 17/30292* (2013.01)

(58) Field of Classification Search
USPC ........................................ 707/603
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |

(Continued)

*Primary Examiner* — Amresh Singh

(74) *Attorney, Agent, or Firm* — Dergosits & Noah LLP; Todd A. Noah

(57) ABSTRACT

Source values are mapped to new user-defined categories. The new user-defined categories are stored in a new user-defined field. In an embodiment, a user-selection of an existing field is received. Based on a data type of the existing field, a specific mapping interface is displayed. The interface guides the user through specification of the new field and categories, and identification of the source values to map to the new categories.

21 Claims, 19 Drawing Sheets

(56) References Cited

U.S. PATENT DOCUMENTS

| | | |
|---|---|---|
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,620,655 B2 | 11/2009 | Larsson |
| 7,698,160 B2 | 4/2010 | Beaven et al. |
| 7,703,021 B1* | 4/2010 | Flam .................. G06F 21/6227 715/741 |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0126476 A1* | 5/2008 | Nicholas ................. G06Q 10/10 709/203 |
| 2009/0063415 A1 | 3/2009 | Chatfield et al. |
| 2009/0319403 A1* | 12/2009 | Schlueter et al. ............. 705/30 |
| 2010/0306199 A1* | 12/2010 | Andrea et al. ................ 707/740 |
| 2011/0264628 A1* | 10/2011 | Sokolan ............ G06F 17/30011 707/634 |

* cited by examiner

| Account Name | Employees | Size | Last Activity | Annual Revenue | Last Modified Date | Billing State |
|---|---|---|---|---|---|---|
| Account A | 75 | Small | 1/12/2011 | 250,000 | 5/17/2011 | PA |
| Account B | | Small | 10/30/2011 | 800,000 | 5/7/2011 | CA |
| Account C | 88 | Small | 10/7/2011 | 500,000 | 6/9/2011 | NY |
| Account D | 501 | Mid | 3/8/2010 | 2,000,000 | 10/7/2011 | VA |
| Account E | 772 | Mid | 8/8/2010 | 8,000,00 | 10/30/2011 | CA |
| Account F | 44 | Small | 7/4/2011 | 323,000 | 8/5/2011 | FL |
| Account F | 1523 | Large | 9/17/2010 | 20,000,000 | 1/12/2011 | NJ |

*FIG. 7*

Picklist Field UI

Edit Mapping Field    805

○ Create a mapping field to categorize your data.
  This field will appear as a column and can be used like any other field.

810A  Source Field: [ Billing State/Province ▾ ]  —815

Mapping Field Name: [ Name this collection of mappings ]    —820

Unmapped Values (16)   —823

All Mappings (16)      —826

[ New Mapping ]  —829

810B

| | Map To ▾ —832 | | Sort by: Mapping ↓ —835 | [🔍 Quick Find] —838 |

○  ──── List of all picklist values

☐ CA
☐ FL
☐ GA
☐ IL
☐ KS
☐ KY
☐ MA
☐ MI
☐ NE
☐ NH
☐ NJ
☐ NV
☐ NY

810C

☐ Put uncategorized values into "Other."  —811

[ OK ]  [ Cancel ]

Dismiss

*FIG. 8*

Mappings are color-coded to help you see the groupings easier.

| | Map To ▾ |
|---|---|
| ☐ | central CA |
| ☐ | central KS |
| ☐ | central KY |
| ☐ | east FL |
| ☐ | east GA |
| ☐ | east IL |
| ☐ | west MA |
| ☐ | west MI |
| ☐ | west NE |
| ☐ | west NH |
| ☐ | Other NJ |
| ☐ | Other NV |
| ☐ | Other NY |

Unmapped Values (0)

All Mappings (16)
- east (3)
- west (4)
- central (3)
- Other (6)

New Mapping

1105

Sort by: Mapping ↓

Quick Find

Sort by Mapping or by Value

1110

☑ Put uncategorized values into "Other."  ○——— Put all uncategorized and future values into an "Other" bucket

*FIG. 11*

Select a mapping on the left to filter to those values. Hover over a mapping and click on icons to rename or delete it.

| Unmapped Values (0) | Map To ▼ | Sort by: Mapping ↓ | Quick Find |
|---|---|---|---|
| All Mappings (...) | ☐ east FL | | |
| ● east (3) | ☐ east GA | | |
| ● west (4) | ☐ east IL | | |
| ● central (3) ✏ 🗑 | | | |
| ● Other (6) | | | |
| New Mapping | | | |

☑ Put uncategorized values into "Other."

FIG. 12

Bucket Field added

When you click OK, the new bucket field appears in your report as well as the fields list. It can be treated like any other field (e.g. you can group, filter, sort by it).

| salesforce | | | | | Video Tutorial \| Help for this Page |
|---|---|---|---|---|---|
| Unsaved Report Account Date Set | | | | | |

| Save | Save As | Close | Report Properties | Run Report | |
|---|---|---|---|---|---|

Fields
Quick Find
Expand All | Collapse All

Mapping Fields
 <Add Mapping Field>
  Region
 Account: General
 Account: Address
 Account: Ph/Fax/URL

Filters  Add ▼

Show: My Accounts

Date Field: Created Date  Range: Previous CQ  From: 7/1/2010  To: 9/30/2010

You can edit or delete the bucket field from either the fields list or column

_1305_

Preview  Tabular Format ▼  Show ▼  Insert ▼

/—1310

| Account Owner | Account Name | Region | Billing State/Province | Employees |
|---|---|---|---|---|
| David Light | Dickenson Mobile Generators | East | MA | 2950 |
| Emily DuFontaine | Dickenson Mobile Generators | Central | NE | 1240 |
| Ethan Hunt | United Oil Refinery Generators | East | FL | 125 |
| Horace Brown | Dickenson Mobile Generators | East | GA | 53 |
| James Smith | Edge Emergency Generator | East | NY | 25 |
| Jane Ateda | Edge Emergency Generator | West | CA | 354 |
| John Greer | United Oil Installations | Central | MI | 1560 |
| Kate Lilly | United Oil Installations | West | OR | 89 |

*FIG. 13*

Text Field UI
Similar to picklist design except that it is search based.

Edit Mapping Field  1405

Create a mapping field to categorize your data.
This field will appear as a column and can be used like any other field.

Source Field: Account Name
Mapping Field Name: Name this collection of mappings
1415

Search  1420

Search  1410C

All Mappings (0)
= Other

New Mapping

Search for Account Name values that you'd like to map

OK   Cancel

Dismiss

FIG. 14

| Account Owner | Account Name | Company | Annual Revenue |
|---|---|---|---|
| Chuck Nicol | Dell USA | Dell | 250,000 |
| Ben Serotta | Dell Europe | Dell | 800,000 |
| Roland Della Santa | Dell APAC | Dell | 500,000 |
| Paul Sadoff | IBM USA | IBM | 2,000,000 |
| John Slawata | IBM EMEA | IBM | 8,000,00 |
| Dave Kirk | IBM ASIA | IBM | 323,000 |

*FIG. 16*

SYSTEMS AND METHODS FOR MAPPING A VALUE TO A NEW DOMAIN

CLAIM OF PRIORITY

This application claims the benefit of U.S. Provisional Patent Application 61/500,219, entitled SYSTEMS AND METHODS FOR MAPPING A VALUE TO A NEW DOMAIN, by Marko Koosel, filed Jun. 23, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to computer systems and software, and, more particularly, to mapping a value to a new domain.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Reports are a fundamental part of many organizations working towards improved business intelligence and knowledge management. There are many different ways reports can be useful. For example, reports can help to provide status, help people manage resources and make decisions, and provide information. But, report information has little value unless it is organized, aggregated, and presented in a usable form.

Many report building and designing tools, however, are cumbersome and difficult to use—especially if the user desires to see the data arranged along a new dimension. For example, the reporting tool may require specialized knowledge in computer coding. Users such as end-users and business analysts are unlikely to possess such knowledge because their area of expertise may be more business and industry focused. It can be very difficult for such users to customize reports in order to present different perspectives of the data.

Therefore, there is a need for improved systems and techniques for making reports.

BRIEF SUMMARY

In an embodiment, source values are mapped to new user-defined categories. The new user-defined categories are stored in a new user-defined field. In an embodiment, a user-selection of an existing field is received. Based on a data type of the existing field, a specific mapping interface is displayed. The interface guides the user through specification of the new field and categories, and identification of the source values to map to the new categories.

In an embodiment and by way of example, a method for mapping a value to a new domain includes receiving a selection from a user of a first field for storing a plurality of source values, prompting the user to name a second field that will store one or more target categories, prompting the user to identify at least a subset of the plurality of source values to map to a target category, prompting the user to name the target category, storing the target category in the second field, and mapping the at least a subset of source values to the target category.

While one or more implementations and techniques are described with reference to an embodiment in which mapping a value to a new domain is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 7 illustrates an updated report having the new user-defined field and categories in an embodiment;

FIG. 8 illustrates a screen shot of an interface to map a source field of a picklist data type in an embodiment.

FIG. 11 illustrates a screen shot showing color-coded mappings in an embodiment;

FIG. 12 illustrates a screen shot show techniques to filter, rename, or delete a mapping in an embodiment;

FIG. 13 illustrates a screen shot having a report updated with the new user-defined field and categories in an embodiment;

FIG. 14 illustrates a screen shot of an interface to map source values of a text data type in an embodiment;

FIG. 16 illustrates an updated report having the new user-defined field and categories in an embodiment;

DETAILED DESCRIPTION

Systems and methods are provided for mapping a value to a new domain, which may be referred to as "bucketing."

Figure 1:
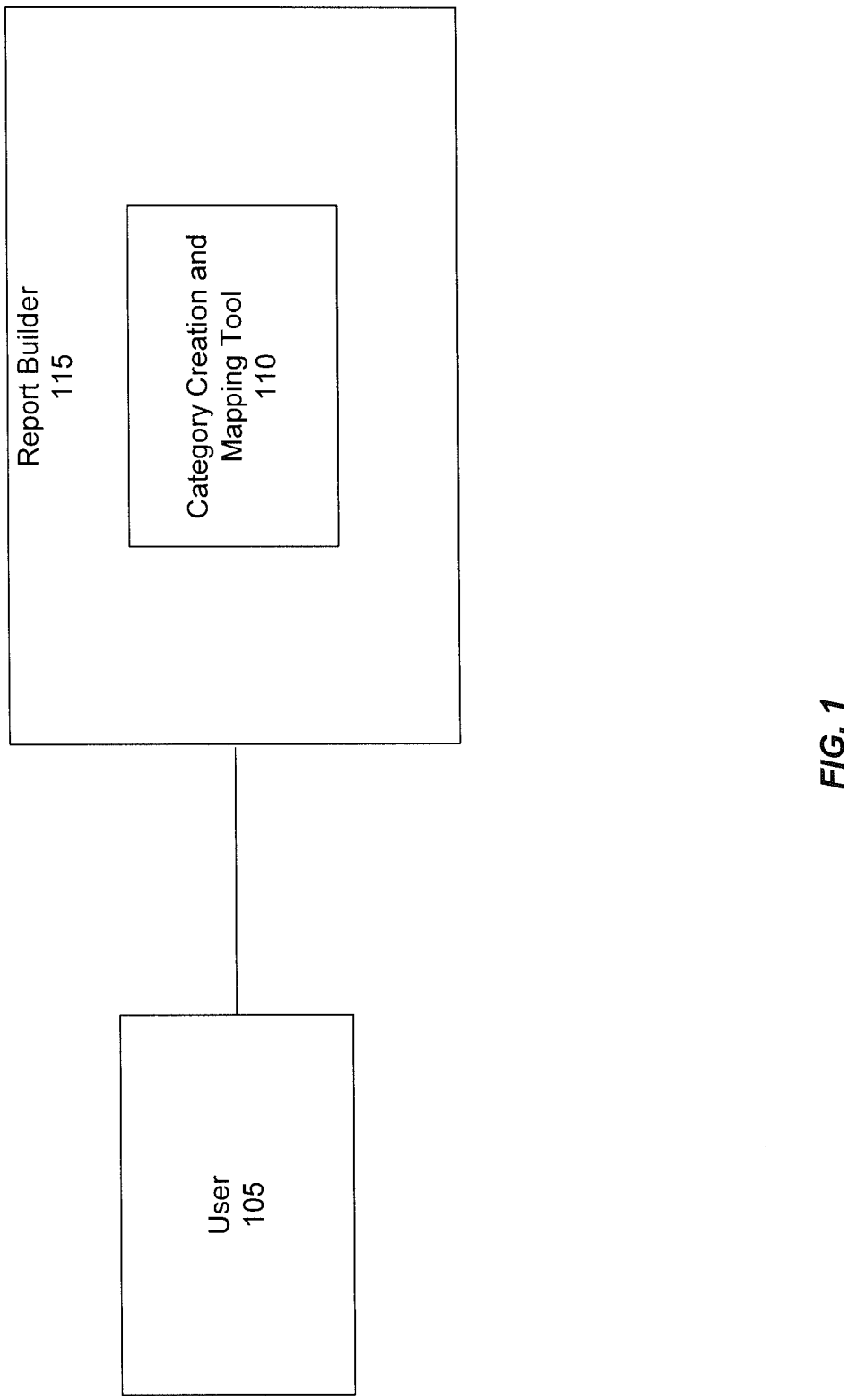
FIG. 1 illustrates a block diagram of a tool for mapping source values from an existing source field to a new user-defined field and categories in an embodiment.

FIG. 1 is a simplified block diagram of a tool or system 105 that a user 110 can use to create a new field, new categories within the new field, and map source values to the new categories. In a specific implementation, the tool provides a graphical user interface (GUI) that guides the user through the category creation and mapping process. More particularly, in a specific implementation, the user selects an existing source field that stores or holds existing source values, specifies a new category field, specifies new target or destination categories for the new category field, and identifies the source values to be mapped to the new target categories.

A specific application of the tool is with a report builder 115. Reports provide information in a presentable, human-readable form. A report can be a printed or paper report. Alternatively, a report may be in an electronic format and displayed on an electronic screen. Reports can be used to display the result of an activity, operation, experiment, investigation, or inquiry. Reports are used in many different types of entities and organizations such as business and government. Organizations rely on reports to help make decisions, understand different alternatives, and gain business intelligence insight—just to name a few examples. A report can include elements such as charts and tables that summarize, categorize, group, and classify information.

In a specific implementation, user 110 is an end-user or business analyst. The user may want to create new categories of report information to present the information along a new dimension or perspective. With this tool, the user who may not have specialized application coding knowledge, can quickly and easily make (and edit) a new field category, specify new categories for the field category, and map source values to the new categories. The tool provides users with the ability to create custom reports having user-defined fields, categories, and mappings without administrator involvement.

For example, a sales operations analyst may want to group certain stock-keeping units (SKUs) into product lines. Many organizations have thousands of products and mappings constantly change. Some products may have associated revenue and other products may not have associated revenue. With the tool, the analyst can "bucket" or categorize products having no associated revenue into an "other" product line. As another example, a sales manager may want to see deals they have by deal size. With the tool, the sales manager can "bucket" the deals by deal size (e.g., "large" deals, "medium" deals, and "small" deals). As another example, a support manager may want to see how many cases have been open in different age groups. With the tool, the support manager can "bucket" the cases by the different age groups.

Figure 2:
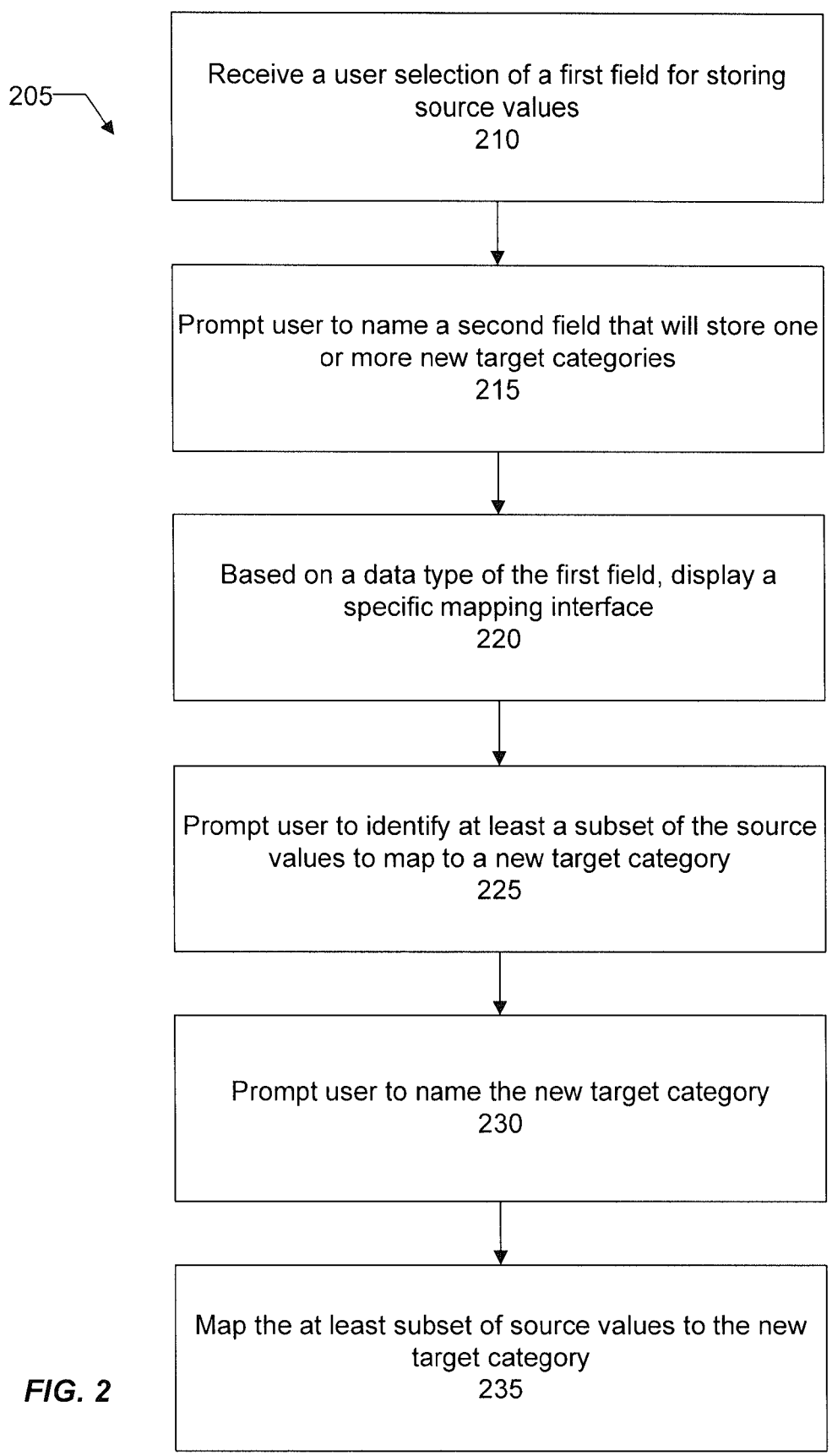
FIG. 2 illustrates an overall flow diagram of the tool in an embodiment.

FIG. 2 shows an overall flow 205 of a specific embodiment of category creating and mapping tool 105. Some specific flows are presented in this application, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

In brief, in a step 210, the tool receives a user selection of a first field for storing a set of source values. The first field may be referred to as a source field or an existing source field. In a step 215, the tool prompts the user to name a second field that will store one or more new user-defined target categories. The second field may be referred to as a bucket field, a mapping field, a category field, or a destination field. In a step 220, based on a data type of the first field, the tool displays a specific mapping user interface or widget. In a step 225, through the interface, the user is prompted to identify at least a subset of the source values to map to a new target category. In a step 230, the tool prompts the user to name the new target category. In a step 235, the tool maps the at least subset of source values to the new target category.

Referring now to step 210, in a specific implementation, the tool provides a graphical control or widget that allows the user to select a first field that stores, holds, contains, or is associated with a set of source values that the user would like to "bucket" or categorize into one or more new user-defined categories. That is, the categories do not yet exist or have not yet been created. The user may make the selection using an input device such as a keyboard or a pointing device, such as a mouse or stylus. The user may instead or additionally indicate a selection using a voice command or their finger such as in implementations where there is a touch screen (i.e., a computer display screen that can function as an input device).

Figure 4:
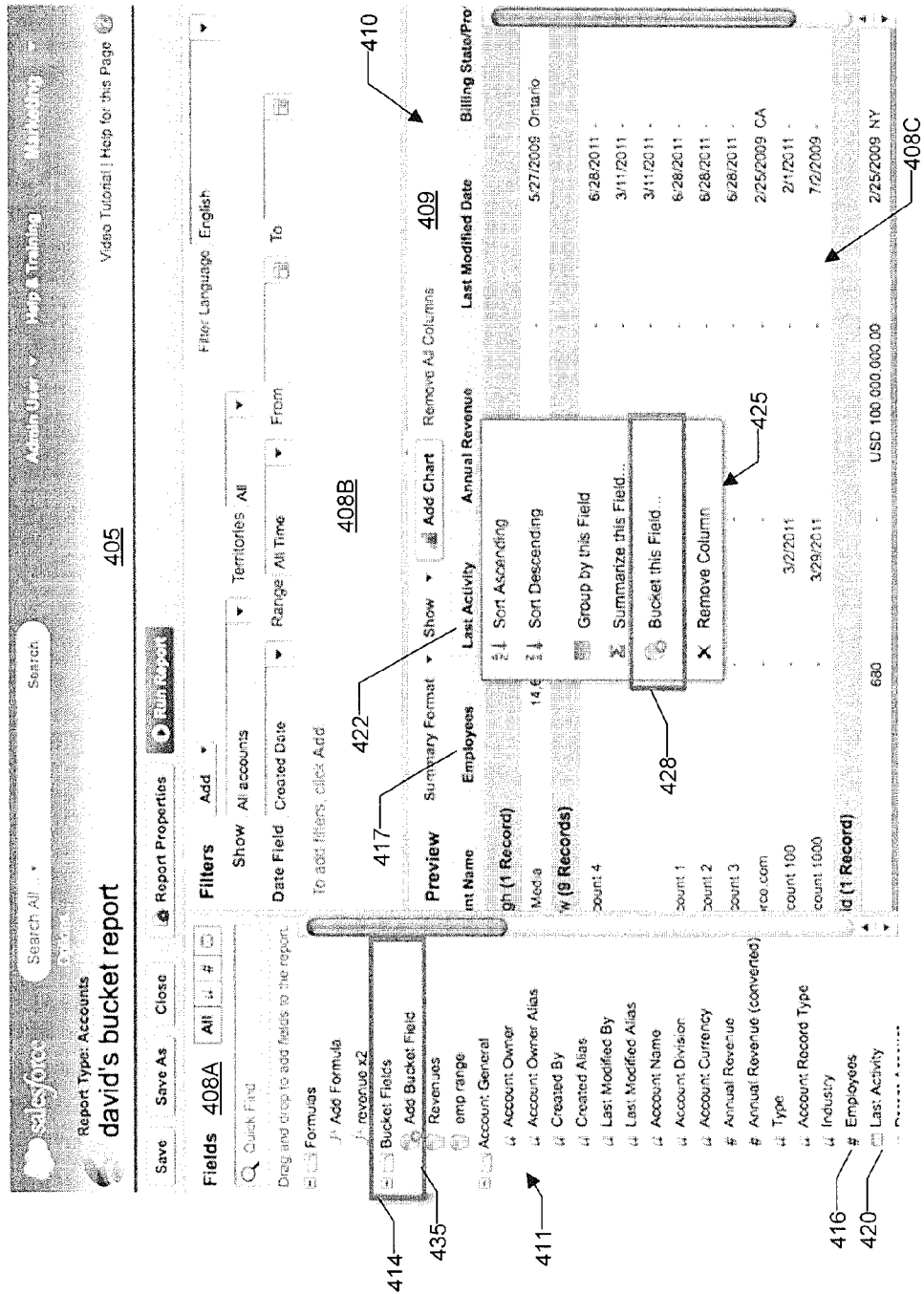
FIG. 4 illustrates a screen shot of a report in an embodiment.
Figure 5:
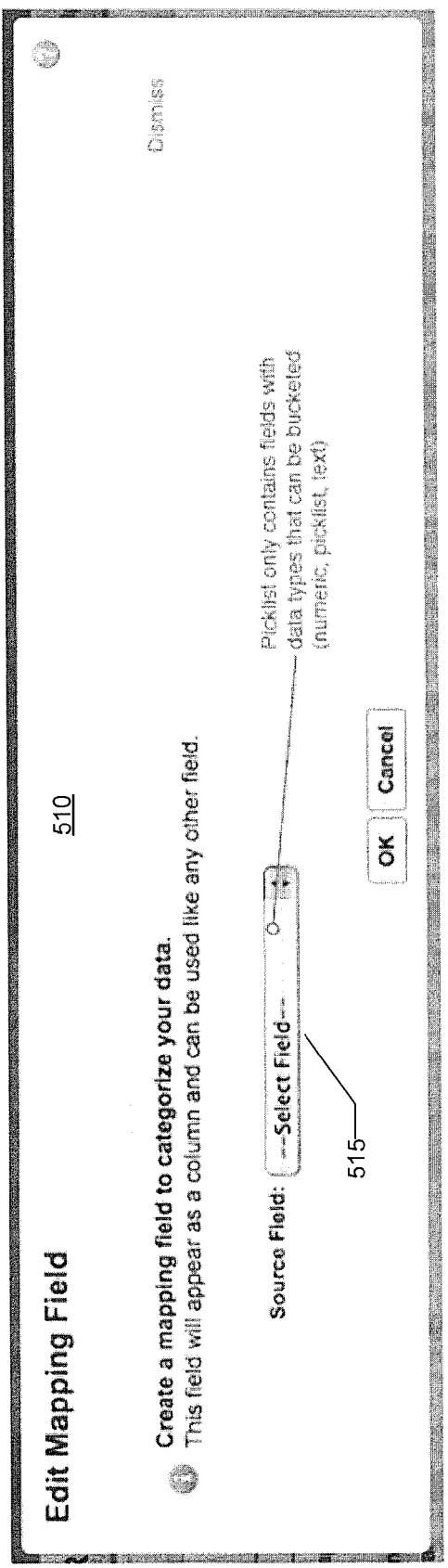
FIG. 5 illustrates a screen shot of an interface to select a source field in an embodiment.
Figure 6:
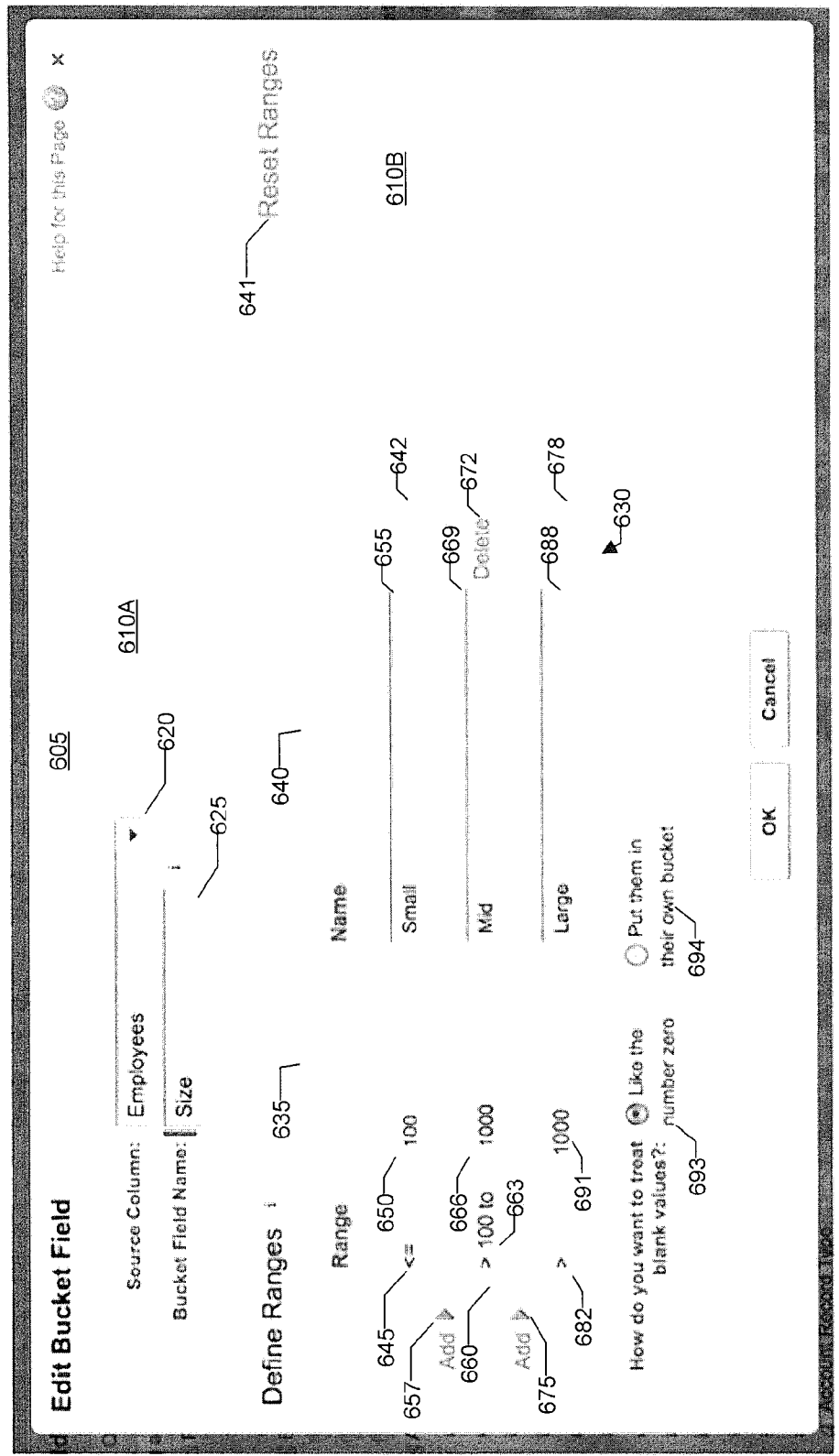
FIG. 6 illustrates a screen shot of an interface to map a source field of a numeric data type in an embodiment.
Figure 15:
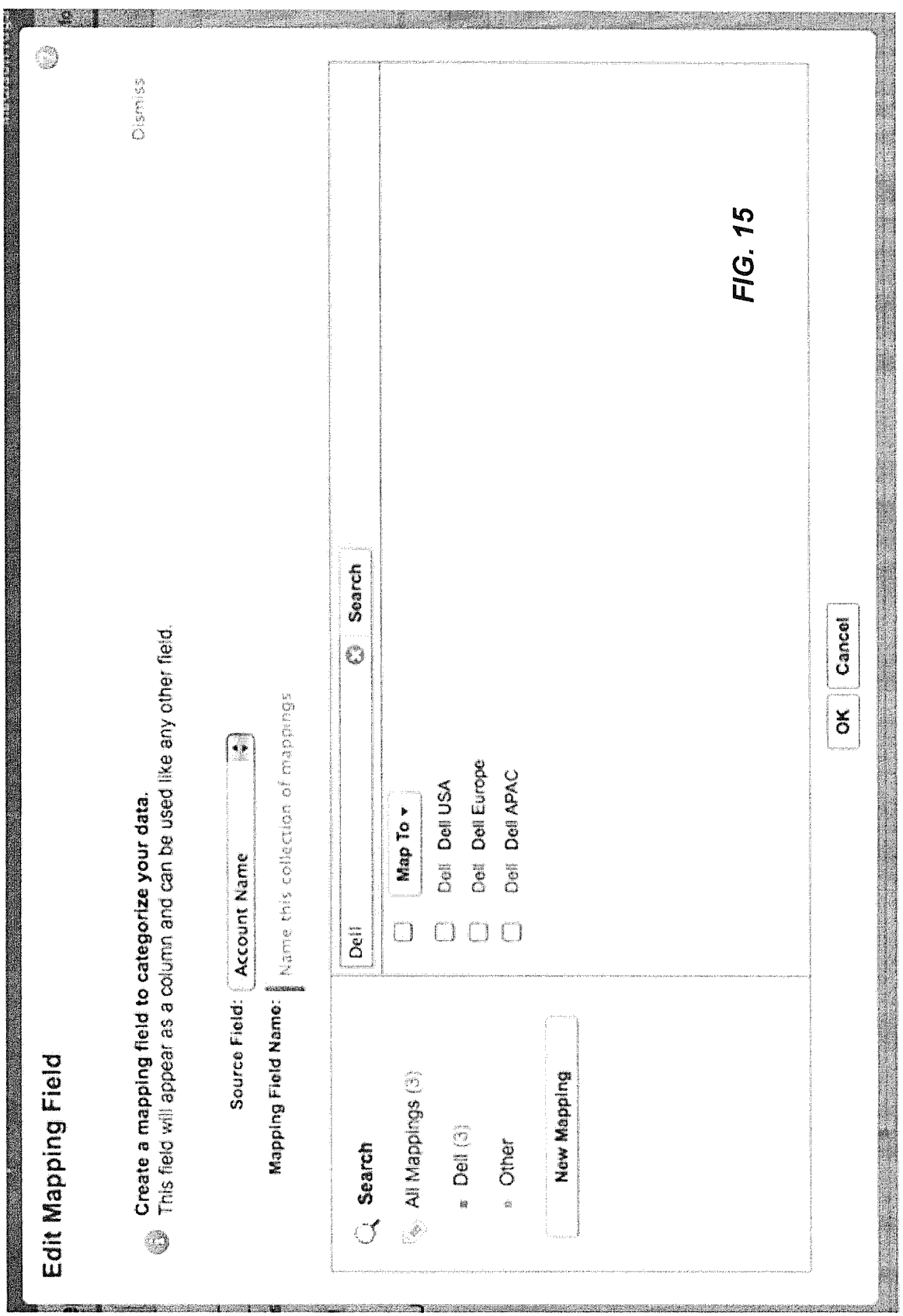
FIG. 15 illustrates another screen shot of an interface to map a source field of a text data type in an embodiment.

As an example, FIGS. 4-16 show some screenshots or GUIs that may be provided by the tool or a report builder product having features of the tool. More particularly, FIGS. 4-5 show different options for a user to identify the source field to "bucket." FIGS. 6-7 show creating a bucket field based on a source field having a numeric data type. FIGS. 8-13 show creating a bucket field based on a source field having a picklist data type. FIGS. 14-16 show creating a bucket field based on a source field having a text data type.

In this specific implementation, the screen shots are of web pages displayed on an electronic screen to a user. The web pages are generated by a report building product provided by salesforce.com, inc. of San Francisco, Calif. It should be appreciated, however, that the tool may be implemented in any report builder product. These screen shots and the accompanying description are provided merely as a sample implementation. It should be understood that the invention is not limited to the specific examples and features presented. A system of the invention may have additional features (not necessarily described in this application), different features which replace some of the features or components presented, fewer features or a subset of the features presented, or features in a different order than presented, or any combinations of these. Aspects (e.g., screens or web pages) of the invention may be modified or altered as appropriate for a particular application, industry, business, or use.

FIG. 4 shows an example of a web page 405 having a report. The web page includes graphical user interface (GUI) controls or widgets that allow the user to select a field that may or may not have source values to "bucket" or categorize. The web page may be displayed in a browser application program executing on a client machine of the user. As shown in FIG. 4, the web page includes first, second, and third panes 408A, 408B, and 408C, respectively. Displayed within the third pane is a report table 409. The report table includes a set of records and a set of fields or columns 410. The fields may store or hold one or more source values. In this example, there is an "Employees" field 417 for storing source values specifying the number of employees associated with a particular record. The source value is of a numerical data type. There is a "Last Activity" field 422 for storing source values specifying a date of last activity associated with a particular record. The source value is of a date data type.

First pane 408A includes a field list 411, and a bucket fields folder 414. The fields are implemented as an expandable and collapsible folder tree. The field list includes a set of report fields or columns that correspond to report fields or columns of report table 409. For example, an "Employees" field 416 in the field list corresponds to "Employees" field 417 in the report table. A "Last Activity" field 420 in the field list corresponds to "Last Activity" field 422 in the report table, and so forth.

In this specific implementation, the tool provides several techniques for the user to specify the source field to "bucket." This provides the user with the flexibility to choose the technique they are comfortable with. In a first technique, the tool provides a pop-up column menu 425 having an option 428 "Bucket this Field." The column menu may be triggered by hovering a pointing device over the field in the report table to bucket and clicking. For example, to "bucket" or categorize the values in the "Employees" field, the user may click field 417 to trigger the column menu and then select option 428.

In a second technique, the tool provides a drag-and-drop control or command. The tool permits the user to drag a field from the fields list to the bucket fields folder. For example, the user can drag employees field 416 to bucket fields folder 414 in order to "bucket" or categorize the source values in the employees field.

In a third technique, the tool provides a user-selectable control 435 "Add Bucket Field." Specifically, the user can click (e.g., double-click) the "Add Bucket Field" control and a window 510 (FIG. 5) is displayed to prompt the user to select which field to bucket. In this specific implementation, the window is implemented as an overlay or overlay window. That is, the window overlays the window having the report. In other implementations, the window may replace the window having the report, rather than being overlaid on the window having the report.

Window 510 includes a drop-down list 515 that includes fields which can be bucketed. The user can select a field from the drop-down list and confirm their selection by clicking "OK." In a specific implementation, the tool allows bucketing of specific data types only. In this specific implementation, the drop-down list includes only fields with data types that the tool allows to be bucketed and other fields having data types that are not allowed to be bucketed are omitted or excluded from the drop-down list.

Figure 3:
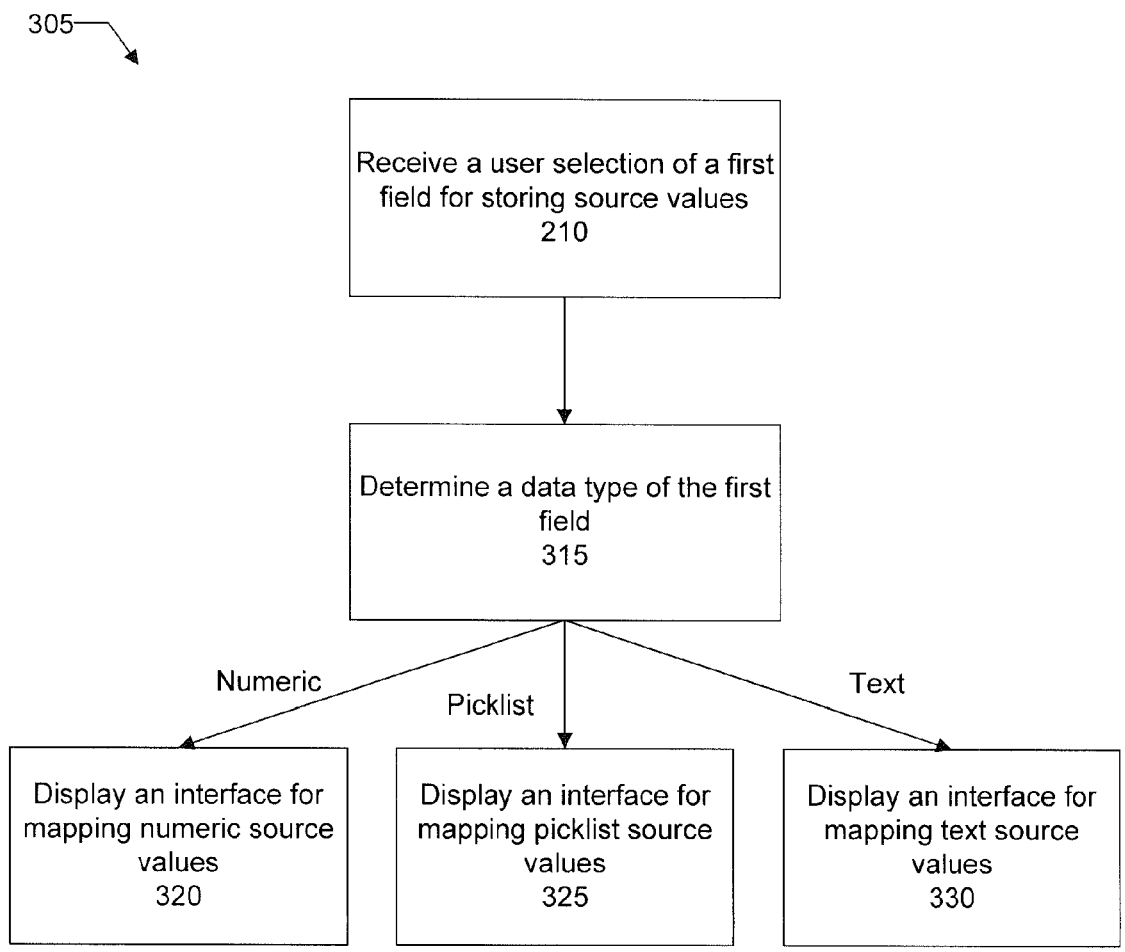
FIG. 3 illustrates a flow diagram for displaying a specific mapping GUI interface based on a data type of the existing source field in an embodiment.

Referring now to FIG. 2, in step 215, the tool prompts the user to specify or name a second field (or bucket field) that will store one or more new target categories. Based on a data type of the first field, the tool displays a specific mapping interface (step 220) that prompts or guides the user through identifying at least a subset of source values from the first field to map to a new target category (step 225). For example, FIG. 3 shows a flow 305 for displaying to a user a specific mapping interface. In step 210, the user's selection of the first or source field is received. In a step 315, the tool determines a data type of the source field. If the data type is a numeric data type, a specific interface for mapping numbers is displayed (step 320)—see FIG. 6. If the data type is a picklist data type, a specific interface for mapping picklist values is displayed (step 325)—see FIGS. 8-12. If the data type is a text data type, a specific interface for mapping text values is displayed (step 330)—see FIGS. 14-15.

For example, as shown in FIG. 6, there is an overlay window 605 having a mapping interface to map numeric data type source values. This mapping interface allows the user to specify or create the second field (or bucket or category field), one or more target categories to be stored in the second field, and map source values to the one or more target categories. Overlay 605 includes a first section 610A and a second section 610B, below the first section. The first section includes a drop-downlist 620 labeled "Source Column," and an input or text box 625 labeled "Bucket Field Name." The drop-down list displays the name of the source column or field (i.e., "first field"—step 210, FIG. 2) that may store or will store the source values that the user would like to "bucket" or categorize. Text box 625 allows the user to input a name for the bucket or category field (i.e., "second field"—step 215, FIG. 2).

In the example shown in FIG. 6, the user has selected the field "Employees" and has named the bucket field "Size." More particularly, in this example, the "Employees" field stores source values identifying numbers of employees; and the user has decided to create a new field named "Size" to hold the new target categories.

The second section includes a table 630. The table permits the user to define source value ranges and the mapping of the ranges to the new target categories. The table includes a first column 635 labeled "Range" and a second column 640 labeled "Name" to name or label the new target categories. A "Reset Ranges" link 641 allows the user to reset the ranges (e.g., delete the inputted ranges).

In this example, a first row 642 of the table includes, in the first column, a mathematical or relational operator 645 and a text box 650 positioned on a right-hand side of the mathematical operator, and, in the second column, a text box 655. The mathematical operator is the operator for "less than or equal to." Text box 650 allows the user to input an upper limit for the "less than or equal to" operator. In other words, to input a numerical value (e.g., 100) to specify in conjunction with the operator a mathematical expression, statement, or condition. In this example, the user has defined a first range to include a condition "number of employees less than or equal to 100."

Note that the example shown in FIG. 6 is merely an example of one particular implementation. In other implementations, the tool can support between xy or other variants. In a specific implementation, the tool allows the user to specify a range by defining a lower limit value for the range, an upper limit value for the range, or both. For example, there can be a first input box for the user to input the lower limit value for the range, a second input box for the user to input the upper limit value for the range, and a third input box for the user to input a name for the range. In various specific implementations, the tool can map values between the user-defined lower limit and upper limit values to the user-defined range name, map values greater than the lower limit to the user-defined range name, map values less than the upper limit to the user-defined range name, or combinations of these.

More particularly, the condition between the lower and upper limit values can be a "less than," "greater than," "not equal to," "less than or equal to," or "greater than or equal to." The "less than condition" may be indicated by the mathematical symbol or notation "<." The "greater than" condition may be indicated by the notation ">." The "not equal to" condition may be indicated by the notation "≠." The "less than or equal to" condition may be indicated by the notation "≤." The "greater than or equal to" condition may be indicated by the notation "≥." A range may be referred to as an inequality statement or function. In an implementation, the tool allows users to define custom inequality statements. This may include displaying or providing input boxes so that users can define a left side of an inequality statement, a right side of the inequality statement, an inequality condition between the left side and the right side, or combinations of these.

As shown in FIG. 6, there can be multiple ranges (e.g., two or more ranges). In a specific implementation, the ranges are consecutive or successive, e.g., no gaps between the ranges. In another specific implementation, users may define ranges that are non-consecutive or non-successive, e.g., there can be gaps between the ranges.

Text box 655 allows the user to name a new target category, i.e., to specify a name or label for the new target category. In this example, the user has indicated that the first range is to be mapped to the new target category labeled "Small." Based on the mapping indication, the tool associates report records satisfying the first range condition "number of employees less than or equal to 100" with a first new target category that has been labeled "Small."

An "Add" link 657 permits the user to add a second row 660 to the table to include a second range. The second row of the table includes, in the first column, a mathematical operator 663 and a text box 666, and in the second column, a text box 669. There is a "Delete" link 672 for the user to delete the second row or to delete the second range. In this specific implementation, mathematical operator 663 is the operator for "greater than." The upper limit from the first range (e.g., 100) defaults to be the lower limit of the second range. Text box 666 allows the user to input an upper limit for the second range (e.g., 1000). In this example, the user has defined the second range include a condition "number of employees between 100 and 1000."

Text box 669 is similar to text box 655. That is, text box 669 allows the user to name another new target category. In this example, the user has mapped the second range to a new target category labeled "Mid." Based on the mapping indicated by the user, the tool associates records satisfying the condition "number of employees between 100 and 1000" with a second new target category that has been labeled "Mid."

An "Add" link 675 permits the user to add a third row 678 to the table to include a third range. In this example, the third row includes, in the first column, a mathematical operator 682 and a lower limit 691, and in the second column, a text box 688. In this specific implementation, mathematical operator 682 is the operator for "greater than." The upper limit of the second range defaults to be lower limit 691 of the third range. In this example, the third range is defined to include a condition "number of employees greater than 1000."

Text box 630 is similar to text box 672. That is, text box 630 allows the user to name another new target category. In this example, the user has mapped the third range to a new target category labeled "Large." Based on the mapping indicated by the user, the tool associates records satisfying the condition "number of employees greater than 1000" with a third new target category that has been labeled "Large."

In this specific implementation, the tool guides the user through defining and mapping ranges. The user-inputted upper limit of the first range (e.g., 100) defaults to a non-editable lower limit of the second range. Similarly, the user-inputted upper limit of the second range (e.g., 1000) defaults to a non-editable lower limit of the third range. This helps to ensure that there are no gaps between the ranges. In some cases, however, users may desire less guidance or may desire gaps between the ranges. So, in other specific implementations, a user-inputted upper limit of a first range may default to be an editable lower limit of a second range.

Second section 610B further includes radio buttons 693 and 694 below table 630. The radio buttons allow the user to indicate how they would like the tool to treat blank values. For example, the user can select radio button 693 to treat blank values like the number zero. Thus, records having a blank or null value for the number of employees are treated as having zero employees and would be associated with the first new category that has been labeled "Small." Alternatively, the user can select radio button 694 to put these values (or records) in their own bucket or new category.

When the user has completed the range definition and indicated the range mappings to the various new target categories, the user may click the "OK" button. The tool then maps or associates the relevant source values from the source field (e.g., Employees) to the target categories (step 235, FIG. 2).

Although FIG. 6 shows three ranges or three new target categories being created (e.g., "Small," "Mid," and "Large") it should be appreciated that the tool allows creating any number of ranges or categories that the user desires. In the example of FIG. 6, the mathematical operators are non-editable to help simplify the creation of the ranges. In other specific implementations, the mathematical operators may be editable. For example, the user may be allowed to choose from a list (e.g., drop-down list) which operators to use. There may be an input box on a left-hand side of the operator to create the desired condition.

Further, it should also be appreciated that the specific mathematical operators shown in FIG. 6 for defining ranges is merely an example. In other specific implementations, the tool may be configured to allow the user to create mathematical expressions involving other mathematical operations or combination of operations including, for example, greater than or equal to, equal to, percentage calculations, multiplication, division, subtraction, addition, a logical NOT, a logical OR, a logical exclusive OR, a logical equivalence, a logical implication, a NOT equal, and the like.

FIG. 7 shows an example of an updated report table 705, based on report table 409 (FIG. 4), as a result of having added the bucket field "Size." As shown in report table 705, there is a new column or field 710 for storing or holding a set of new target categories 715. FIG. 7 is a continuation of the examples shown in FIGS. 4-6. Field 710 is the new bucket field, based on existing source field "Employees," that the user has labeled "Size" (see reference numbers 620 and 625, FIG. 6). The field holds new target categories including "Small," "Mid," and "Large."

More specifically, based on the mapping in table 630 (FIG. 6), the "Small" category is associated with records or accounts satisfying the user-specified range or condition "number of employees less than or equal to 100." The "Mid" category is associated with accounts satisfying the condition "number of employees between 100 and 1,000." The "Large" category is associated with accounts satisfying the condition "number of employees greater than 1,000." Accounts where the number of employees is blank (e.g., "Account B") have been treated like the number zero as indicated by the user (see reference number 693, FIG. 6).

When a new record having a new source value is added, the tool can automatically categorize the record based on the particular value of the new source value and the mappings (or conditions) defined previously. For example, when a new account is added, the tool can automatically categorize the account based on the number of employees associated with the new account. The user does not have to perform another mapping process for the newly added account.

For example, if the new account includes a number of employees less than or equal to 100, the new account is automatically categorized in the "Small" category. If the number of employees is between 100 and 1,000, the new account is automatically categorized in the "Mid" category. If the number of employees is greater than 1,000, the new account is automatically categorized in the "Large" category. Thus, it is not always the case that an existing source field will have existing source values. New records having new source values can be added after the bucket field is created.

The bucket field may be associated with a particular user or user account so that each user can have their own view of a report. For example, sales vice presidents and sales managers are usually concerned with the number of deals they have open by deal size. Depending on their sales segment, different sales managers will have their own definitions of deal sizes. For corporate sales, they may be concerned with small deals that are less than $10K, medium $10K-$25K, and big deals that are over $25K. For field sales manager, these deal sizes would be less important since their deals are may be much bigger. For them, small deals are less than $250K, medium $250K-$1M, and big deals are over $1M.

In a specific implementation, a first user-configured view of a report includes a first bucket field based on a source field. The first bucket field includes a first set of categories mapped to a first set of source values from the source field. A second user-configured view of the report includes a second bucket field based on the source field. The second bucket field includes a second set of categories mapped to a second set of source values from the source field. The first set of categories may be the same or different from the second set of categories. For example, the category labels of the first and second set of categories may be the same or different. The first set of source values may be different from the second set of source values. Thus, a field sales manager may have a view of a report with a bucket category labeled "medium" that maps to deal sizes between $250K and $1M. A junior sales manager may have a different view of the report with a bucket category that may also be labeled "medium," but that maps to deal sizes between $10K and $25K. A report may have any number of user-defined bucket fields. In a specific implementation, there is a limit of 20 bucket fields in a single report. It should be appreciated, however, that the limit may be less than 20 bucket fields or greater than 20 bucket fields.

FIGS. 8-13 show some interfaces for creating a bucket field based on a source field having a picklist data type. Generally, a picklist field contains a list of one or more items from which a user chooses a single item. FIG. 8 shows an overlay window 805 having a mapping interface for a source field of a picklist data type. The overlay window includes a first section 810A that spans above second and third sections 810B and 810C, respectively. There is an option 811 for the user to indicate how uncategorized values should be treated. The third section is next to the second section. The second section may be referred to as a left sidebar. The third section may be referred to as a source value listing.

First section 810A is similar to first section 610A in FIG. 6. For example, first section 810A includes a drop-downlist 815 for the user to select the source field having the source values to categorize, and a text box 820 for the user to name the bucket or mapping field. Second section 810B includes an "Unmapped Values" folder 823, an "All Mappings" folder 826, and a "New Mapping" button 829. Third section 810C includes a "Map To" menu 832, a "Sort by Mapping" link 835, and a search or find box 838.

The interface in overlay window 805 provides several techniques for a user to indicate the mappings. In a first technique, the user can indicate the mappings using "Map To" menu 832. For example, referring now to FIG. 9, third section 810C includes a list of source values 835 from the source field (e.g., "Billing State/Province" field) and a list of corresponding checkboxes 838 adjacent to the list of source values.

Figure 9:
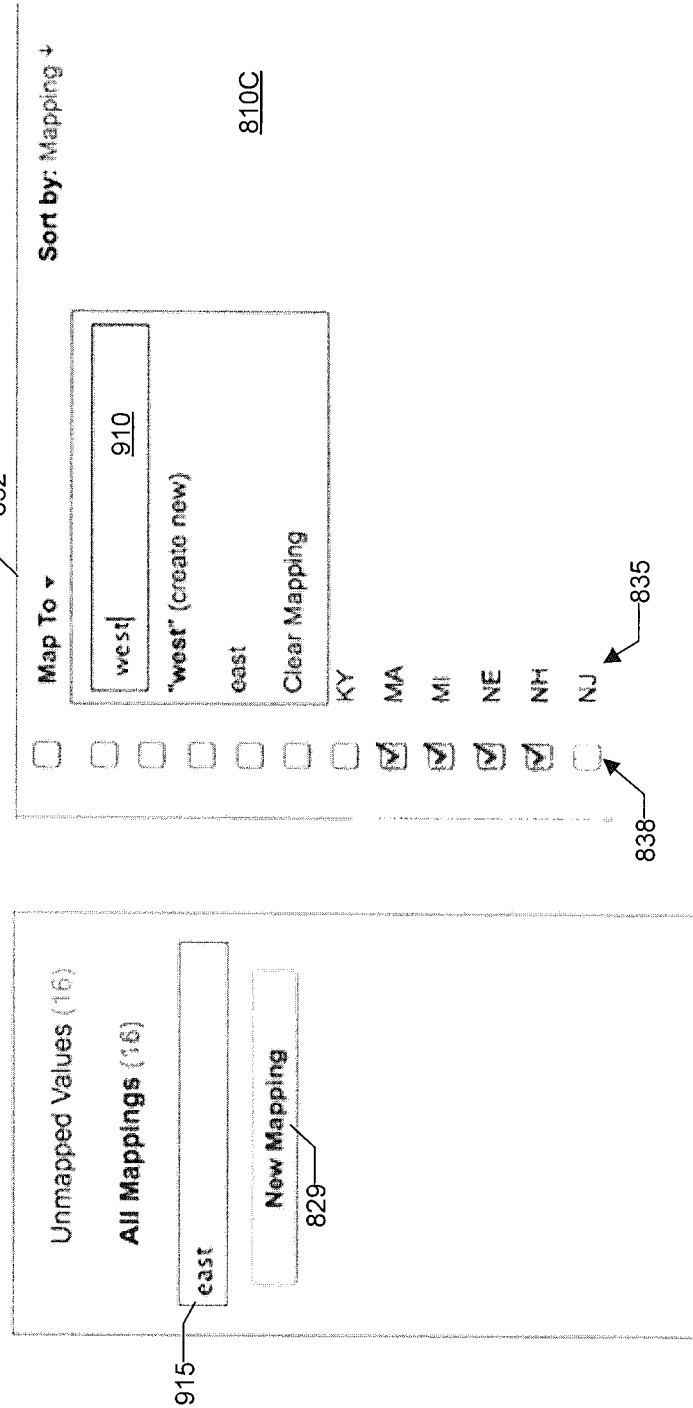
FIG. 9 illustrates a screen shot of a technique to map a source field of a picklist data type in an embodiment.

A user can map one or more of the source values to a new category by selecting the desired source values via the corresponding checkboxes and clicking "Map To" menu 832. As shown in FIG. 9, the menu includes a text box 910 for the user to input a new category that the selected source values will be mapped to. The menu may further include a list of previously created categories (e.g., "east") and "Clear Mapping" control to delete the mappings. In the example shown in FIG. 9, the user has selected the source values "MA," "MI," "NE," and "NH" to be mapped to a new category that the user has labeled "west."

Figure 10:
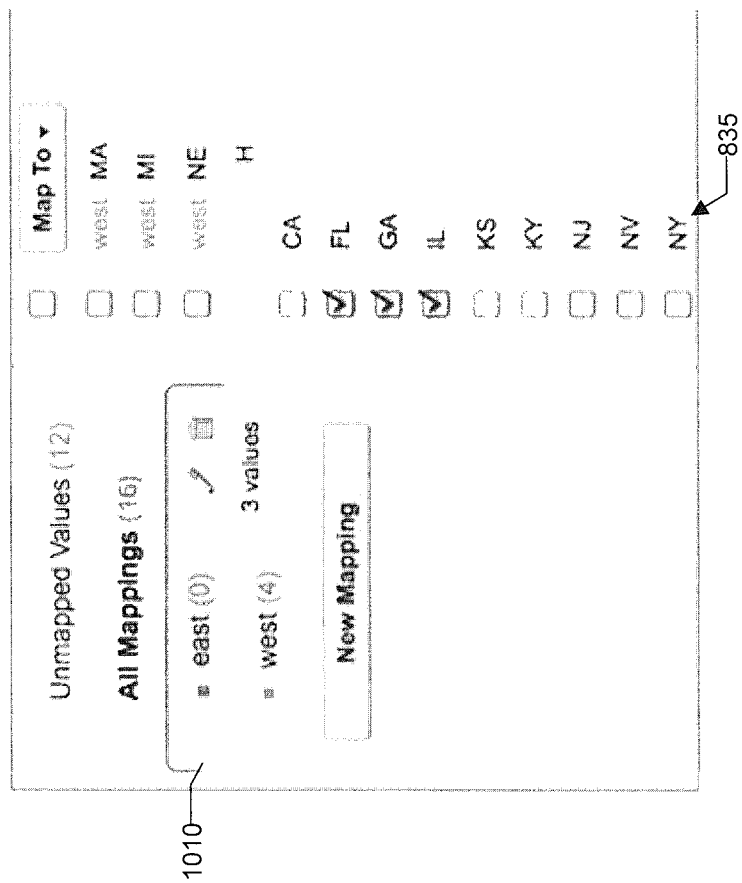
FIG. 10 illustrates a screen shot of another technique to map a source field of a picklist data type in an embodiment.

Alternatively, in a second technique, the user can map source values by dragging them onto the second section or left sidebar. The user can click "New Mapping" button 829 and enter a name of the new mapping (or new category) in text box 915. In this example, the user has named the new category "east." As shown in FIG. 10, the user can indicate the source values that should be mapped to the new category by selecting and dragging the source values from source value list 835 onto the left sidebar (or into a newly created "east" category folder 1010 on the left sidebar). Thus, in this example, the source values "FL," "GA," and "IL" will be associated with the category "east." Category folder 1010 may further include options to edit the category (e.g., click pencil icon), delete the category (e.g., click trashcan icon), or both. Editing a category may including renaming the category, removing source values from the category, adding source values to the category, or combinations of these.

FIG. 11 shows an example of an updated left sidebar 1105 and source value listing 1110. The folders in the left sidebar may include a counter indicating a number of source values associated with the folder. For example, as shown in FIG. 11, there are 0 "Unmapped Values" and 16 source values that have been mapped. Specifically, 3 source values have been mapped to the category "east," 4 source values have been mapped to the category "west," 3 source values have been mapped to the category "central," and 6 source values have been mapped to the category "Other."

The source value listing has been tagged with the category to which the source value has been mapped to. For example, as shown in FIG. 11, the source values "CA," "KS," and "KY" are mapped to the category "central." The source values "FL," "GA," and "IL" are mapped to the category "east," and so forth.

In a specific implementation, the mappings or categories are color-coded to help distinguish the different categories. For example, the category "central" may be displayed in a first font color and the category "east" may be displayed in a second font color, different from the first font color. For example, the first font color may be blue. The second font color may be green. It should be appreciated that any color or combination of colors may be used, e.g., orange, purple, yellow, pink, red, and so forth. It should be appreciated, however, that any graphical element or visual indicator (not necessarily a color) may be used to visually distinguish the categories. Some examples of other visual indicators that may be used instead of or in addition to color include icons, shapes, symbols, and the like.

FIG. 12 shows an example of filtering categorized source values. In a specific implementation, the user can filter the source values by selecting a mapping or category from the left sidebar. For example, as shown in FIG. 12, clicking the category "east" shows source values categorized as "east," (e.g., "FL," "GA," and "IL) and filters out source values that are not in the "east" category. A user may hover over a mapping or category and click on the pencil icon to rename the category or click on the trashcan icon to delete the category.

FIG. 13 shows an example of a report table 1305 having been updated with a new bucket field 1310. The user has named the bucket field "Region." That is, a new column or field named "Region" has been added to or inserted in the report table. In other words, before the update the report table did not include the bucket field "Region." The "Mapping Fields" folder in the field list has also been updated with the field "Region." The bucket field "Region" is based on the "Billing State/Province" field and stores the user-defined categories "East," "Central," and "West."

As discussed above and shown in FIG. 13, the states "MA," "FL," "GA," and "NY" have been mapped to the category "East." The states "NE," and "MI" have been mapped to the category "Central." The states "CA," and "OR" have been mapped to the category "West." The new bucket field (e.g., "Region") can be treated like any other field. For example, it can be grouped, filtered, or sorted. When a user filters on a bucket, the user can see the list of category names. This can greatly simplify filtering on buckets. For example, as shown in FIG. 13 there is a filtering tool 1315 above report table 1305. The filtering tool allows the user to block unwanted data or records, e.g., exclude, omit, or prevent records having certain criteria from being shown in the report table. The user can use the filter tool to create a filter associated with the new bucket field "Region." There can be a drop down box or other graphical input control that lists the region categories, e.g., "East," "Central," "West," and so forth. Using the drop down box, the user can, for example, select the "East" category to filter out or block records that specify the region "East" from being shown in the report table. Instead or additionally, there can be a reverse filter tool or filter option that filters out or blocks records not specifying the region "East." It should be appreciated that the graphical input control or graphical user interface for selecting the filter categories can allow of the selection of a single filter category or multiple filter categories, e.g., filter out records that specify the region "East" or "Central."

As discussed above, if the user adds a new record having a new source value whose mapping was defined previously, the new source value is categorized automatically. For example, if a new account having a new "Billing State" of "MA" is added, "MA" is mapped automatically to the "east" category. If a new account having a new "Billing State" of "CA" is added, "CA" is mapped automatically to the "west" category, and so forth.

In this specific implementation, the bucket field column (e.g., "Region") has been inserted on a left-hand side of the source field column (e.g., "Billing State/Province"). It should be appreciated, however, that the bucket field column may be inserted at any location in the report table such as on a right-hand side of the source field column. In a specific implementation, a bucket field column replaces the source field column. In a specific implementation, the insertion location of a bucket field depends on the type of report. In this specific implementation, for tabular format reports, the bucket field is added on the left side of the original source column. In summary format reports, the bucket field is added as an additional summary step above the original source field. In matrix format reports, the new bucket field replaces the original source field.

FIGS. 14-16 show some interfaces for creating a bucket field based on a source field (e.g., "Account Name") that has a text data type. As shown in FIG. 14, this interface may be similar to the picklist interface (see FIG. 8) except that this interface is search based. More particularly, an overlay window 1405 includes a section 1410C including a text box 1415, and a search button 1420. The user can search for source values in the source field by inputting keywords or search terms in text box 1415 and clicking the search button. For example, the user can search for account name values to map by inputting the account names (or portions of the account names) in text box 1415 and clicking the search button.

As shown in the example of FIG. 15, the user has inputted the text "Dell" to search for source values (e.g., account names) in the source field (e.g., "Account Name") that include the word "Dell." The returned search results include "Dell USA," "Dell Europe," and "Dell APAC." In a specific implementation, the tool uses the "start with" semantics or query condition, clause, function, predicate, or operator. The query clause may instead be "contains" or "ends with" or another variant. There can be a menu to let the user choose. It should be appreciated that the search tool can support any query clause or combination of query clauses. Searches may be based on proximity (e.g., NEAR), exact phrase, wildcards, and the like. The user may map the results to a new category (e.g., "Dell") by using the "Map To" menu or by dragging the results onto the left sidebar (see FIGS. 9-10 and accompanying discussion). FIG. 16 shows an updated report table 1605 having a new user-defined bucket field 1610 (e.g., "Company") storing the new user-defined categories (e.g. "Dell" and "IBM").

The mapping interface examples shown in FIGS. 6, 8, and 14 have been designed for numeric, picklist, and text data types, respectively. It should be appreciated, however, that there can be a specific mapping interface for other data types such as date which allow the user to specify one or more date ranges that map to a user-defined category. In this specific implementation, a mapping interface includes first, second, and third text or input boxes. The first text box allows a user to specify a beginning date of a date range, the second text box allows the user to specify an ending date of the date range, and the third text box allows the user to specify a category name to be mapped to the date range. Aspects of the category creating and mapping tool may be applied to any data type or field type such as polymorphic, string, Boolean, currency, percent, email, phone, time, universal resource locator (URL), and so forth.

It should be appreciated that the tool is not limited to the specific GUI controls, widgets, objects, elements, containers, icons, windows, views, navigation, help text, and layouts shown in the screenshots. Various specific implementations may include GUI elements such as floating windows, modal windows, palette or utility windows, pop-up boxes, dialog boxes, frames, list boxes, context menus, sliders, spinners, menu bars, combo boxes, scroll bars, tabs, tree views, grid views, tooltips, balloon help, infobars, links, buttons, icons, and the like. There may be validation rules for the input boxes so that certain fields are mandatory (e.g., bucket field name may be mandatory or a field name may be limited to 250 characters).

Figure 17:
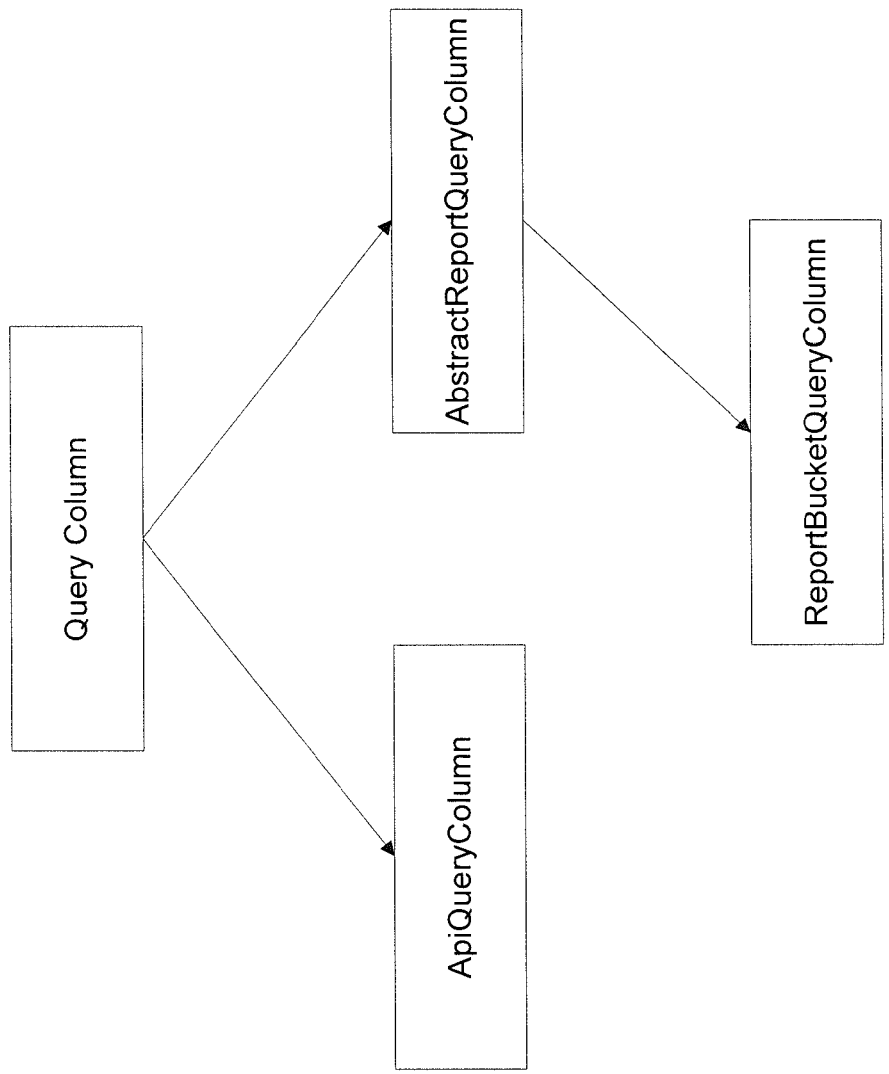
FIG. 17 illustrates a block diagram showing the relationship of a bucket query column modeled as a ReportBucketQueryColumn in an embodiment.

FIG. 17 and the accompanying description below describes a specific implementation of the invention. In other implementations, other similar and equivalent elements, functions, and techniques may be used or substituted in place of what is described. For example, the description below describes an implementation with an Oracle database, but one of skill in the art will recognize that aspects of the invention may applied to products or databases provided by, for example, IBM, Microsoft, Sybase, and so forth.

This specific implementation describes mapping values from an existing reporting field into a new, report-specific field. For example, "opportunity.revenue" can be mapped to a new field called "BinnedRevenue" with values "High," "Medium," and "Low." The field "BinnedRevenue" may exist only within the scope of the report in which it is defined. In another specific implementation, the field is available for other reports.

A field that is created by the bucketing process may be referred to as a "bucket field." In an embodiment, a bucket field is based on a single "source field" that is visible within a report, e.g., opportunity.revenue, opportunity.stage, product.name. The user interface ("UI") for defining a bucket specifies a mapping of values from the source field to a set of destination values, e.g., a bucket field called AcctRegion maps values from the source field account.BillingState to target bucket values "East," "West," "North," and "South." A special bucket value, "Other," can be defined to catch all values that have not been explicitly mapped.

In an embodiment, a bucket field has a data type, similar to other report fields. The data type is String (text), as bucket values in this specific embodiment are limited to string values. In an embodiment, the mapping for a bucket field source must be unique, i.e., a source field value must deterministically map to one and only one target bucket. However, multiple ranges can map to the same bucket value, e.g., the mapping for a numeric field can map values less than 10 to a bucket value "outliers," 11 to 50 to "small," 51 to 100 to "high," and values greater than 100 to "outliers."

In another specific implementation, a source field value may map to multiple target buckets (e.g., two or more target buckets).

In an embodiment, a bucket field can be included in these parts of a report: (1) column list, (2) grouping column, (3) field filter, (4) limit rows, aka top-N, and (5) sort. A filter on a bucket field can be included in Filter logic.

In an embodiment, a bucket field is prevented from being summarized because it can be a field of a Text data type. In another embodiment, a bucket field may be summarized.

In this specific implementation, SQL for a bucket field is not stored in the database (db) but is generated at runtime as it should be a fast operation. For numeric source fields, ranges defined by from_number and to_number must not overlap or are prevented from overlapping. In this specific implementation, the UI has no gaps in ranges. So the from_number and to_number of the preceding one is the same. It should be appreciated, however, that the schema can be more general to allow gaps if ever needed. Source_value column is unique within a bucket field value for text and picklist source fields. In a specific implementation, SQL is generated and executed to evaluate bucket fields.

In an embodiment, the UI for defining a bucket is dependent on the data type of the source field. The UI for numeric fields may look different from that of picklists and text. For example, the UI for picklists may involve displaying all available picklist values to the user. Determining which picklist values to display may be the same list that is shown when a user clicks the lookup icon in the filter panel for the value of a picklist field. Generating the list of values to display in the UI for text fields may be accomplished in a number of ways.

In an embodiment, the UI for picklists and text has a checkbox to force all source values that have not been explicitly mapped to a target value to be auto-mapped to a special "Other" bucket value. If this option is not selected, then all non-mapped values may appear as if they mapped to a bucket value with the identical name as the source value.

Report Available Fields

Bucket fields may be displayed in a special bucket folder in the available fields tree. Similar to other fields, they can be dragged to the preview pane, double-clicked, multi-selected, and searched. In an embodiment, async execution is supported when a bucket field is added to a report.

Field Filter Available Fields

In an embodiment, all bucket fields defined in a report are included in field selector dropdown for filters. They appear at the beginning of the list. They can be quick searched like other fields. In an embodiment, ext store for the available field is created once only on page load. With bucket fields created/deleted on the fly, the store may need to be kept in sync.

Report Preview Column UI

In an embodiment, once a bucket has been defined and added to the report's column list, the column selector for this new bucket field can support sorting, grouping, etc. similar to regular fields. The "summarize this field" may be greyed out. Bucketing for fields that have already been bucketed may be disabled. A bucket field can be re-positioned with the report's list of columns.

In an embodiment, a SQL statement or a single SQL statement is generated to calculate a bucket or multiple buckets (e.g., two or more buckets).

ReportTypeInfo

In an embodiment, the class contains all ReportColumn objects specific to a standard or custom report type. It may be used to validate if a column name/id is valid. The class, or a wrapper, may need to include bucket fields as well that are specific to a report. This class, as suggested by the name ReportType, may not be aware of report level information where bucket fields live.

The SQL code generation for bucket fields may differ from other fields because a bucket is a calculation that is based upon another reporting column. This dependency adds complexity because Oracle does not allow an expression in the Select list to refer to an alias of an expression that is defined in the same select list. However, it may be necessary for the bucketing calculation to refer to an alias in order to deal with complicated expressions like Opportunity.AGE, as well as to minimize the SQL string length. (Without an alias, the source column's SQL may require repetition for every bucket value, e.g., if you segment opportunity age into 20 ranges then the expression for opportunity.age is replicated 21 times.)

In an embodiment, to avoid Oracle's aliasing restriction, one may construct an outer query block around the original query block and evaluate the bucketing calculation in the outer block. This may create a few differences in code generation:

1. must add a nesting query, i.e., an outer query block that wraps the inner query block
2. the bucket field should generate no SQL in the inner block.
3. the bucket field should generate bucketing SQL in the outer block. This SQL refers to the source column via a column alias defined in the inner block.

In an embodiment, a bucket field in a report starts out as a ReportBucketColumn and is then transformed into a bucket query column as part of query optimization/execution. A bucket query column is modeled as a ReportBucketQueryColumn in the QueryColumn family. FIG. 17 illustrates the relationship.

SQL Code Generation

In an embodiment, bucketing may be implemented using custom field formulas. Implementing bucketing for numeric fields may involve defining a custom formula field using nested IF functions. The generated SQL below uses nested Oracle CASE-WHEN expressions. Note that it maps null values to 0.

```
SUBSTR(CASE WHEN (NVL(o.amount, 0)<40000) THEN 'Low'
ELSE CASE WHEN (NVL(o.amount, 0)<150000) THEN 'Medium'
ELSE 'High' END END, 0, 1300) "00Nx0000003KMMX"
```

In an embodiment, implementing bucketing for picklists and text fields is done with a custom formula field using the CASE function. Below is an example of some generated SQL:

```
SUBSTR(CASE WHEN (o.stage_enum IS NOT NULL AND
o.stage_enum = 1) THEN 'Early' WHEN (o.stage_enum IS NOT NULL
AND o.stage_enum = 4) THEN 'Early' WHEN (o.stage_enum IS NOT
NULL AND o.stage_enum = 10) THEN 'Yippee' ELSE
'Other' END, 0, 1300) "00Nx0000003KMMc"
```

Implementing bucketing for picklists for the "uncategorized" bucketing feature may be done with a similar formula to above except the default value is replaced with the source field. Due to constraints on picklists and formulas this may also require an explicit data type cast via the TEXT function. Below is another example of some generated SQL:

```
CASE WHEN (TRANSLATE(o.stage_enum,'X0123456789','X')
IS NOT NULL) THEN NULL ELSE SUBSTR(CASE WHEN
(o.stage_enum IS NOT NULL AND o.stage_enum = 1)
THEN 'Early' WHEN (o.stage_enum IS NOT NULL AND
o.stage_enum = 4) THEN 'Early' WHEN (o.stage_enum
IS NOT NULL AND o.stage_enum = 10) THEN 'Yippee'
ELSE (SELECT /*+ index(p akpicklist_master) *//* space for
more hints */ master_label FROM core.picklist_master
p WHERE organization_id = '00Dx0000000WMj1' AND
picklist_enum_or_id = '23' AND int_value = o.stage_enum)
END, 0, 1300) END "00Nx0000003KMYc", CASE WHEN
(TRANSLATE(o.stage_enum, 'X0123456789','X') IS NOT
NULL) THEN 1 ELSE 0 END "00Nx0000003KMYc.AUX",
```

Security

In an embodiment, visibility (FLS) to a bucket field is controlled by the visibility to the bucket's source field. For example, if account.billingstate is bucketed by a bucket field called BillingRegion, then the visibility of BillingRegion is determined by the visibility to account.billingstate.

In an embodiment, CRUD is determined by the user's ability to customize the report. If access is granted to the report builder, then that access may include the ability to create/edit/delete bucket fields. Various methods may be implemented to prevent SQL injection.

Figure 18:
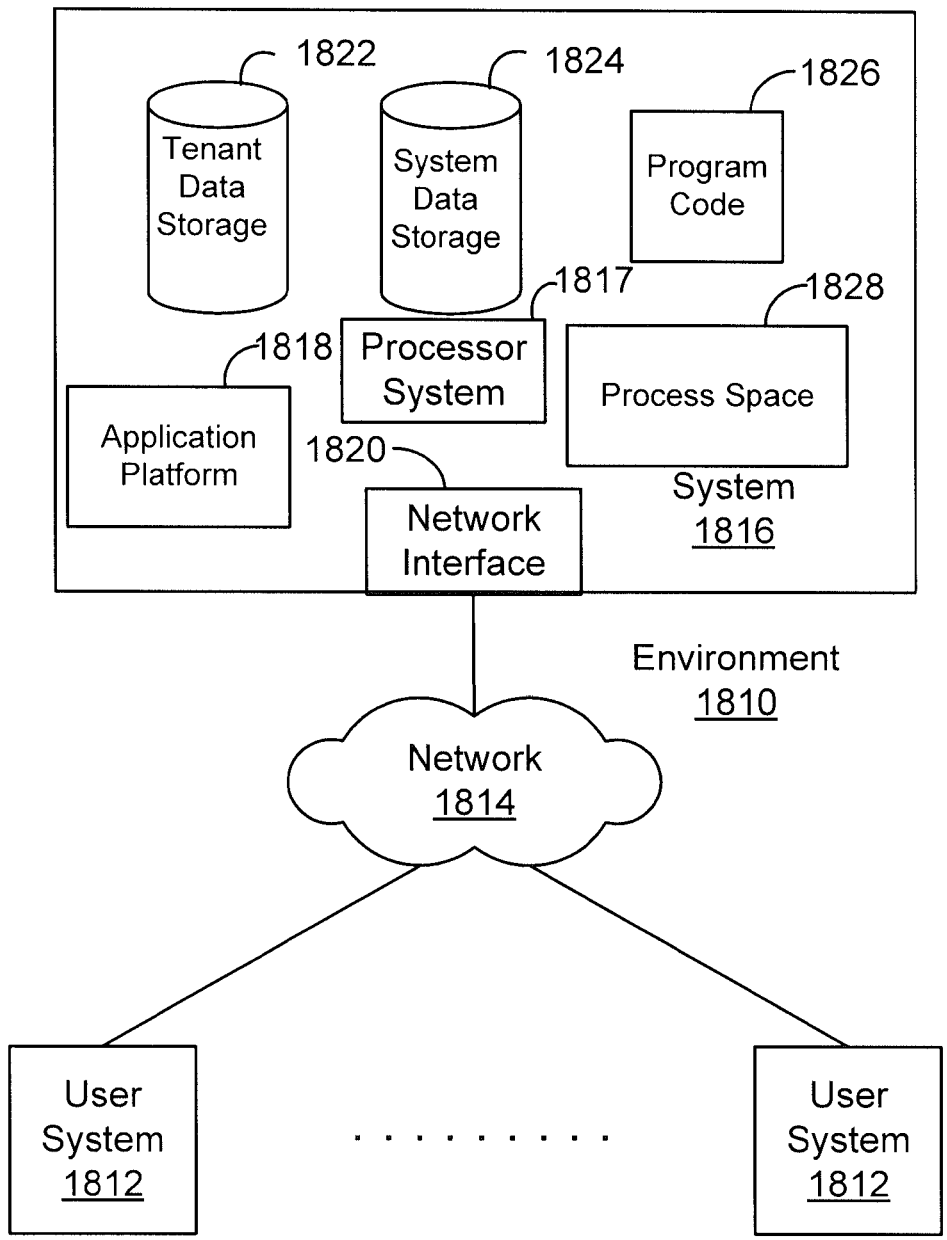
FIG. 18 illustrates a block diagram of an example of an environment wherein an on-demand database service implementing an embodiment of mapping a value to a new domain might be used.

FIG. 18 illustrates a block diagram of an environment 1810 wherein an on-demand database service implementing an embodiment of a system and method for mapping a value to a new domain might be used. Environment 1810 may include user systems 1812, network 1814, system 1816, processor system 1817, application platform 1818, network interface 1820, tenant data storage 1822, system data storage 1824, program code 1826, and process space 1828. In other embodiments, environment 1810 may not have all of the components listed and/or may have other elements instead of, or in addition to, those listed above.

Environment 1810 is an environment in which an on-demand database service exists. User system 1812 may be any machine or system that is used by a user to access a database user system. For example, any of user systems 1812 can be a handheld computing device, a mobile phone, a laptop computer, a work station, and/or a network of computing devices. As illustrated in FIG. 18 (and in more detail in FIG. 19) user systems 1812 might interact via a network 1814 with an on-demand database service, which is system 1816.

An on-demand database service, such as system 1816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1816" and "system 1816" will be used interchangeably herein. A database image may include one or more database objects. A relational database management system (RDMS) or the equivalent may execute storage and retrieval of information against the database object(s). Application platform 1818 may be a framework that allows the applications of system 1816 to run, such as the hardware and/or software, e.g., the operating system. In an embodiment, on-demand database service 1816 may include an application platform 1818 that enables creation, managing and executing one or more applications developed by the provider of the on-demand database service, users accessing the on-demand database service via user systems 1812, or third party application developers accessing the on-demand database service via user systems 1812.

The users of user systems 1812 may differ in their respective capacities, and the capacity of a particular user system 1812 might be entirely determined by permissions (permission levels) for the current user. For example, where a salesperson is using a particular user system 1812 to interact with system 1816, that user system has the capacities allotted to that salesperson. However, while an administrator is using that user system to interact with system 1816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1814 is any network or combination of networks of devices that communicate with one another. For example, network 1814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 1812 might communicate with system 1816 using TCP/IP and, at a higher network level, use other common Internet protocols to communicate, such as HTTP, FTP, AFS, WAP, etc. In an example where HTTP is used, user system 1812 might include an HTTP client commonly referred to as a "browser" for sending and receiving HTTP messages to and from an HTTP server at system 1816. Such an HTTP server might be implemented as the sole network interface between system 1816 and network 1814, but other techniques might be used as well or instead. In some implementations, the interface between system 1816 and network 1814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1816, shown in FIG. 18, implements a web-based customer relationship management (CRM) system. For example, in one embodiment, system 1816 includes application servers configured to implement and execute CRM software applications as well as provide related data, code, forms, webpages and other information to and from user systems 1812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1816 implements applications other than, or in addition to, a CRM application. For example, system 1816 may provide tenant access to multiple hosted (standard and custom) applications, including a CRM application. User (or third party developer) applications, which may or may not include CRM, may be supported by the application platform 1818, which manages creation, storage of the applications into one or more database objects and executing of the applications in a virtual machine in the process space of the system 1816.

One arrangement for elements of system 1816 is shown in FIG. 18, including a network interface 1820, application platform 1818, tenant data storage 1822 for tenant data 1823, system data storage 1824 for system data 1825 accessible to system 1816 and possibly multiple tenants, program code 1826 for implementing various functions of system 1816, and a process space 1828 for executing MTS system processes and tenant-specific processes, such as running applications as part of an application hosting service. Additional processes that may execute on system 1816 include database indexing processes.

Several elements in the system shown in FIG. 18 include conventional, well-known elements that are explained only briefly here. For example, each user system 1812 could include a desktop personal computer, workstation, laptop, PDA, cell phone, or any wireless access protocol (WAP) enabled device or any other computing device capable of interfacing directly or indirectly to the Internet or other network connection. User system 1812 typically runs an HTTP client, e.g., a browsing program, such as Microsoft's Internet Explorer browser, Google's Chrome browser, Mozilla's Firefox browser, Apple's Safari browser, Netscape's Navigator browser, Opera's browser, or a WAP-enabled browser in the case of a cell phone, smartphone, PDA or other wireless device, or the like, allowing a user (e.g., subscriber of the multi-tenant database system) of user system 1812 to access, process and view information, pages and applications available to it from system 1816 over network 1814. Each user system 1812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1816 or other systems or servers. For example, the user interface device can be used to access data and applications hosted by system 1816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1812 and all of its components are operator configurable using applications, such as a browser, including computer code run using a central processing unit such as an Intel Pentium® processor or the like. Similarly, system 1816 (and additional instances of an MTS, where more than one is present) and all of their components might be operator configurable using application(s) including computer code to run using a central processing unit such as processor system 1817, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 1816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Oracle America, Inc.).

According to one embodiment, each system 1816 is configured to provide webpages, forms, applications, data and media content to user (client) systems 1812 to support the access by user systems 1812 as tenants of system 1816. As such, system 1816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 19:
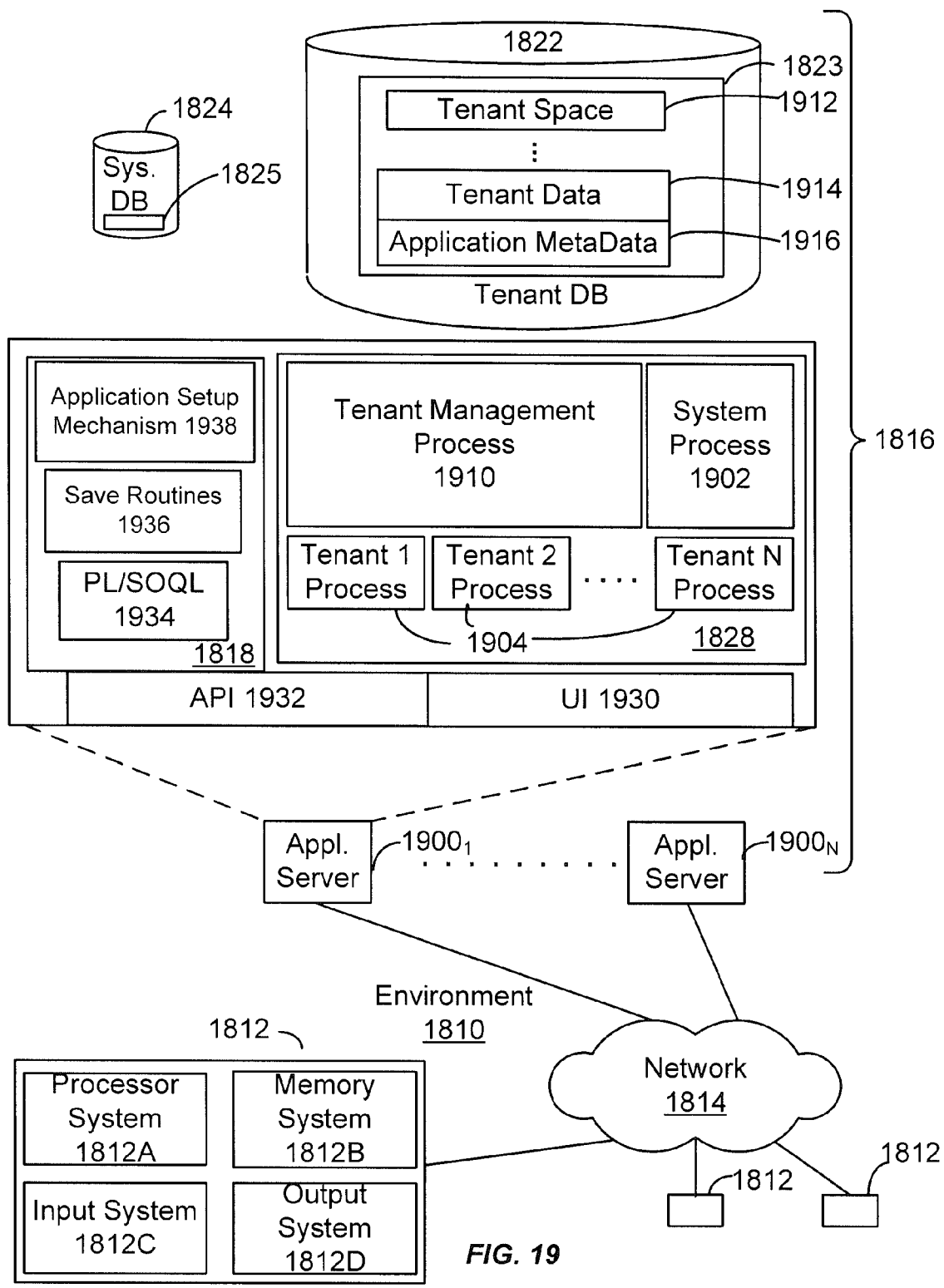
FIG. 19 illustrates a block diagram of an embodiment of elements of FIG. 18 and various possible interconnections between these elements.

FIG. 19 also illustrates environment 1810. However, in FIG. 19 elements of system 1816 and various interconnections in an embodiment are further illustrated. FIG. 19 shows that user system 1812 may include processor system 1812A, memory system 1812B, input system 1812C, and output system 1812D. FIG. 19 shows network 1814 and system 1816. FIG. 19 also shows that system 1816 may include tenant data storage 1822, tenant data 1823, system data storage 1824, system data 1825, User Interface (UI) 1930, Application Program Interface (API) 1932, PL/SOQL 1934, save routines 1936, application setup mechanism 1938, applications servers $1900_1$-$1900_N$, system process space 1902, tenant process spaces 1904, tenant management process space 1910, tenant storage area 1912, user storage 1914, and application metadata 1916. In other embodiments, environment 1810 may not have the same elements as those listed above and/or may have other elements instead of, or in addition to, those listed above.

User system 1812, network 1814, system 1816, tenant data storage 1822, and system data storage 1824 were discussed above in FIG. 18. Regarding user system 1812, processor system 1812A may be any combination of one or more processors. Memory system 1812B may be any combination of one or more memory devices, short term, and/or long term memory. Input system 1812C may be any combination of input devices, such as one or more keyboards, mice, trackballs, scanners, cameras, and/or interfaces to networks. Output system 1812D may be any combination of output devices, such as one or more monitors, printers, and/or interfaces to networks. As shown by FIG. 19, system 1816 may include a network interface 1820 (of FIG. 18) implemented as a set of HTTP application servers 1900, an application platform 1818, tenant data storage 1822, and system data storage 1824. Also shown is system process space 1902, including individual tenant process spaces 1904 and a tenant management process space 1910. Each application server 1900 may be configured to tenant data storage 1822 and the tenant data 1823 therein, and system data storage 1824 and the system data 1825 therein to serve requests of user systems 1812. The tenant data 1823 might be divided into individual tenant storage areas 1912, which can be either a physical arrangement and/or a logical arrangement of data. Within each tenant storage area 1912, user storage 1914 and application metadata 1916 might be similarly allocated for each user. For example, a copy of a user's most recently used (MRU) items might be stored to user storage 1914. Similarly, a copy of MRU items for an entire organization that is a tenant might be stored to tenant storage area 1912. A UI 1930 provides a user interface and an API 1932 provides an application programmer interface to system 1816 resident processes to users and/or developers at user systems 1812. The tenant data and the system data may be stored in various databases, such as one or more Oracle™ databases.

Application platform 1818 includes an application setup mechanism 1938 that supports application developers' creation and management of applications, which may be saved as metadata into tenant data storage 1822 by save routines 1936 for execution by subscribers as one or more tenant process spaces 1904 managed by tenant management process 1910 for example. Invocations to such applications may be coded using PL/SOQL 34 that provides a programming language style interface extension to API 1932. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 1916 for the subscriber making the invocation and executing the metadata as an application in a virtual machine.

Each application server 1900 may be communicably coupled to database systems, e.g., having access to system data 1825 and tenant data 1823, via a different network connection. For example, one application server 1900$_1$ might be coupled via the network 1814 (e.g., the Internet), another application server 1900$_{N-1}$ might be coupled via a direct network link, and another application server 1900$_N$ might be coupled by yet a different network connection. Transfer Control Protocol and Internet Protocol (TCP/IP) are typical protocols for communicating between application servers 1900 and the database system. However, it will be apparent to one skilled in the art that other transport protocols may be used to optimize the system depending on the network interconnect used.

In certain embodiments, each application server 1900 is configured to handle requests for any user associated with any organization that is a tenant. Because it is desirable to be able to add and remove application servers from the server pool at any time for any reason, there is preferably no server affinity for a user and/or organization to a specific application server 1900. In one embodiment, therefore, an interface system implementing a load balancing function (e.g., an F5 Big-IP load balancer) is communicably coupled between the application servers 1900 and the user systems 1812 to distribute requests to the application servers 1900. In one embodiment, the load balancer uses a least connections algorithm to route user requests to the application servers 1900. Other examples of load balancing algorithms, such as round robin and observed response time, also can be used. For example, in certain embodiments, three consecutive requests from the same user could hit three different application servers 1900, and three requests from different users could hit the same application server 1900. In this manner, system 1816 is multi-tenant, wherein system 1816 handles storage of, and access to, different objects, data and applications across disparate users and organizations.

As an example of storage, one tenant might be a company that employs a sales force where each salesperson uses system 1816 to manage their sales process. Thus, a user might maintain contact data, leads data, customer follow-up data, performance data, goals and progress data, etc., all applicable to that user's personal sales process (e.g., in tenant data storage 1822). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1816 might also maintain system level data usable by multiple tenants or other data. Such system level data might include industry reports, news, postings, and the like that are sharable among tenants.

In certain embodiments, user systems 1812 (which may be client systems) communicate with application servers 1900 to request and update system-level and tenant-level data from system 1816 that may require sending one or more queries to tenant data storage 1822 and/or system data storage 1824. System 1816 (e.g., an application server 1900 in system 1816) automatically generates one or more SQL statements (e.g., one or more SQL queries) that are designed to access the desired information. System data storage 1824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
   receiving, from a user, a selection of an existing report field from a plurality of report fields displayed in an existing report table, each of the report fields in the existing report table storing a plurality of source values, the plurality of source values for each of the report fields being associated with a record of a plurality of records in the existing report table;

prompting the user to input a name that will be used to identify a new user-created report field, wherein the new user-created report field will store a plurality of user-created target categories in the existing report table;

determining a data type of the plurality of source values stored in the selected report field;

providing a data type-specific mapping interface that is displayed to the user, the provided data type-specific mapping interface being specific to the determined data type of the plurality of source values;

receiving, from the user via the data type-specific mapping interface, a selection identifying a subset of the source values for mapping to a user-created target category of the plurality of user-created target categories stored in the new user-created report field;

prompting, via the data type-specific mapping interface, the user to input a name used to identify the user-created target category;

mapping each source value of the subset of source values to the user-created target category using the data type-specific mapping interface; and updating the existing report table to include the new user-created report field, where each record of the plurality of records associated with the subset of the source values is also associated with the user-created target category.

2. The method of claim 1 wherein when the data type of the report field is determined to be numerical, the data type-specific mapping interface comprises a first text box, and a second text box, wherein the first text box permits the user to input a numerical limit, the second text box permits the user to create the name of the user-created target category, and each source value of the subset of source values is to be one of greater than the numerical limit, or less than or equal to the numerical limit.

3. The method of claim 1 wherein when the data type of the report field is determined to be picklist, the data type-specific mapping interface comprises:

a listing of the plurality of source values; and the method further includes the step of receiving a user-selection of the subset of source values from the listing that is to be mapped to the user-created target category.

4. The method of claim 1 wherein when the data type of the report field is determined to be text, the data type-specific mapping interface comprises:

a text box for the user to input at least one keyword, the method further comprising:

based on the at least one keyword, searching the plurality of source values;

returning a search result responsive to the at least one keyword; and receiving a user-selection of the subset of source values from the search result that is to be mapped to the user-created target category.

5. The method of claim 1 comprising:

after the mapping each of the plurality of source values to the one or more user-created target categories, updating the report table; and displaying the updated report table, the updated reported table comprising a first column and a second column, the first column comprises the report field and the plurality of source values stored in the report field, and the second column comprises the user-created report field and the plurality of user-created target categories stored in the user-created report field, wherein before the updating a report table, the report table does not comprise the second column.

6. The method of claim 5 wherein the displaying the updated report table comprises:

generating a SQL statement at runtime for the second column.

7. A non-transitory machine-readable medium carrying one or more sequences of instructions, which instructions, when executed by one or more processors, cause the one or more processors to carry out the steps of:

receiving, from a user, a selection of an existing report field from a plurality of report fields displayed in an existing report table, each of the report fields in the existing report table storing a plurality of source values, the plurality of source values for each of the report fields being associated with a record of a plurality of records in the existing report table;

prompting the user to input a name that will be used to identify a new user-created report field, wherein the new user-created report field will store a plurality of user-created target categories in the existing report table;

determining a data type of the plurality of source values stored in the selected report field;

providing a data type-specific mapping interface that is displayed to the user, the provided data type-specific mapping interface being specific to the determined data type of the plurality of source values;

receiving, from the user via the data type-specific mapping interface, a selection identifying a subset of the source values for mapping to a user-created target category of the plurality of user-created target categories stored in the new user-created report field;

prompting, via the data type-specific mapping interface, the user to input a name used to identify the user-created target category;

mapping each source value of the subset of source values to the user-created target category using the data type-specific mapping interface; and updating the existing report table to include the new user-created report field, where each record of the plurality of records associated with the subset of the source values is also associated with the user-created target category.

8. The non-transitory machine-readable medium of claim 7 wherein when the data type of the report field is determined to be numerical, the data type-specific mapping interface comprises a first text box, and a second text box, wherein the first text box permits the user to input a numerical limit, the second text box permits the user to create the name of the user-created target category, and each source value of the subset of source values is to be one of greater than the numerical limit, or less than or equal to the numerical limit.

9. The non-transitory machine-readable medium of claim 7 wherein when the data type of the report field is determined to be picklist, the data type-specific mapping interface comprises:

a listing of the plurality of source values; and the instructions further cause the one or more processors to carry out the step of receiving a user-selection of the subset of source values from the listing that is to be mapped to the user-created target category.

10. The non-transitory machine-readable medium of claim 7 wherein when the data type of the report field is determined to be text, the data type-specific mapping interface comprises:
a text box for the user to input at least one keyword, the instructions further causing the one or more processors to carry out the steps of:
based on the at least one keyword, searching the plurality of source values;
returning a search result responsive to the at least one keyword; and
receiving a user-selection of the subset of source values from the search result that is to be mapped to the user-created target category.

11. The non-transitory machine-readable medium of claim 7 comprising:
after the mapping each of the plurality of source values to the one or more user-created target categories, updating the report table; and
displaying the updated report table, the updated reported table comprising a first column and a second column, the first column comprises the report field and the plurality of source values stored in the report field, and the second column comprises the user-created report field and the plurality of user-created target categories stored in the user-created report field,
wherein before the updating a report table, the report table does not comprise the second column.

12. An apparatus comprising:
a processor; and
one or more stored sequences of instructions which, when executed by the processor, cause the processor to carry out the steps of:
receiving, from a user, from a user, a selection of an existing report field from a plurality of report fields displayed in an existing report table, each of the report fields in the existing report table storing a plurality of source values, the plurality of source values for each of the report fields being associated with a record of a plurality of records in the existing report table;
prompting the user to input a name that will be used to identify a new user-created report field, wherein the new user-created report field will store a plurality of user-created target categories in the existing report table;
determining a data type of the plurality of source values stored in the selected report field;
providing a data type-specific mapping interface that is displayed to the user, the provided data type-specific mapping interface being specific to the determined data type of the plurality of source values;
receiving, from the user via the data type-specific mapping interface, a selection identifying a subset of the source values for mapping to a user-created target category of the plurality of user-created target categories stored in the new user-created report field;
prompting, via the data type-specific mapping interface, the user to input a name used to identify the user-created target category;
mapping each source value of the subset of source values to the user-created target category using the data type-specific mapping interface; and
updating the existing report table to include the new user-created report field, where each record of the plurality of records associated with the subset of the source values is also associated with the user-created target category.

13. The apparatus of claim 12 wherein when the data type of the report field is determined to be numerical, the data type-specific mapping interface comprises a first text box, and a second text box,
wherein the first text box permits the user to input a numerical limit, the second text box permits the user to create the name of the user-created target category, and each source value of the subset of source values is to be one of greater than the numerical limit, or less than or equal to the numerical limit.

14. The apparatus of claim 12 wherein when the data type of the report field is determined to be picklist, the data type-specific mapping interface comprises:
a listing of the plurality of source values; and the instructions further cause the one or more processors to carry out the step of
receiving a user-selection of the subset of source values from the listing that is to be mapped to the user-created target category.

15. The apparatus of claim 12 wherein when the data type of the report field is determined to be text, the data type-specific mapping interface comprises:
a text box for the user to input at least one keyword, the instructions further causing the one or more processors to carry out the steps of:
based on the at least one keyword, searching the plurality of source values;
returning a search result responsive to the at least one keyword; and
receiving a user-selection of the subset of source values from the search result that is to be mapped to the user-created target category.

16. The apparatus of claim 12 comprising:
after the mapping each of the plurality of source values to the one or more user-created target categories, updating the report table; and
displaying the updated report table, the updated reported table comprising a first column and a second column, the first column comprises the report field and the plurality of source values stored in the report field, and the second column comprises the user-created report field and the plurality of user-created target categories stored in the user-created report field,
wherein before the updating a report table, the report table does not comprise the second column.

17. A method for transmitting code comprising:
transmitting code to receive, from a user, a selection of an existing report field from a plurality of report fields displayed in an existing report table, each of the report fields in the existing report table storing a plurality of source values, the plurality of source values for each of the report fields being associated with a record of a plurality of records in the existing report table;
transmitting code to prompt the user to input a name that will be used to identify a new user-created report field, wherein the new user-created report field will store a plurality of user-created target categories in the existing report table;
transmitting code to determining a data type of the plurality of source values stored in the selected report field;
transmitting code to provide a data type-specific mapping interface that is displayed to the user, the provided data type-specific mapping interface being specific to the determined data type of the plurality of source values;

transmitting code to receive, from the user via the data type-specific mapping interface, a selection identifying a subset of the source values for mapping to a user-created target category of the plurality of user-created target categories stored in the new user-created report field;

transmitting code to prompt, via the data type-specific mapping interface, the user to input a name used to identify the user-created target category;

transmitting code to map, each source value of the subset of source values to the user-created target category using the data type-specific mapping interface; and transmitting code to update the existing report table to include the new user-created report field, where each record of the plurality of records associated with the subset of the source values is also associated with the user-created target category.

18. The method of claim 17 wherein when the data type of the report field is determined to be numerical, the data type-specific mapping interface comprises a first text box, and a second text box, wherein the first text box permits the user to input a numerical limit, the second text box permits the user to create the name of the user-created target category, and each source value of the subset of source values is to be one of greater than the numerical limit, or less than or equal to the numerical limit.

19. The method of claim 17 wherein when the data type of the report field is determined to be picklist, the data type-specific mapping interface comprises:

a listing of the plurality of source values; and the method further comprises transmitting code to receive a user-selection of the subset of source values from the listing that is to be mapped to the user-created target category.

20. The method of claim 17 wherein when the data type of the report field is determined to be text, the data type-specific mapping interface comprises:

a text box for the user to input at least one keyword, the method further comprising:

transmitting code to, based on the at least one keyword, search the plurality of source values;

transmitting code to return a search result responsive to the at least one keyword; and transmitting code to receive a user-selection of the subset of source values from the search result that is to be mapped to the user-created target category.

21. The method of claim 17 comprising:

transmitting code to after each of the plurality of source values is mapped to the one or more user-created target categories, update the report table; and transmitting code to display the updated report table, the updated reported table comprising a first column and a second column, the first column comprises the report field and the plurality of source values stored in the report field, and the second column comprises the user-created report field and the plurality of user-created target categories stored in the user-created report field, wherein before the report table is updated, the report table does not comprise the second column.

* * * * *